United States Patent
Miyamoto et al.

(12) 
(10) Patent No.: US 11,177,968 B2
(45) Date of Patent: Nov. 16, 2021

(54) ROLLER-SHAPED ELECTRONIC STAMP

(71) Applicant: International Business Machines Corporation, Armonk, NY (US)

(72) Inventors: Taihei Miyamoto, Tokyo (JP); Masahito Sugita, Saitama (JP); Yoshitaka Kurokawa, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 143 days.

(21) Appl. No.: 16/794,357

(22) Filed: Feb. 19, 2020

(65) Prior Publication Data

US 2021/0258176 A1    Aug. 19, 2021

(51) Int. Cl.
| | | |
|---|---|---|
| *H04L 9/38* | (2006.01) | |
| *H04L 29/06* | (2006.01) | |
| *H04L 9/08* | (2006.01) | |
| *H04W 12/03* | (2021.01) | |

(52) U.S. Cl.
CPC .............. *H04L 9/38* (2013.01); *H04L 9/0819* (2013.01); *H04L 63/0435* (2013.01); *H04L 63/0471* (2013.01); *H04L 63/0492* (2013.01); *H04W 12/03* (2021.01); *H04L 2209/80* (2013.01)

(58) Field of Classification Search
CPC ........................................................ H04L 9/38
See application file for complete search history.

(56) References Cited

U.S. PATENT DOCUMENTS

| | | | |
|---|---|---|---|
| 7,081,905 B1 * | 7/2006 | Raghunath .............. | G06F 1/163 345/684 |
| 9,564,046 B2 * | 2/2017 | Breedvelt-Schouten ..................... | G06F 3/017 |
| 9,946,510 B2 | 4/2018 | Namgung et al. | |
| 2014/0253467 A1 | 9/2014 | Hicks et al. | |
| 2014/0267339 A1 | 9/2014 | Dowd et al. | |
| 2018/0232506 A1 * | 8/2018 | Kumar ................. | G06F 3/0488 |

FOREIGN PATENT DOCUMENTS

| | | |
|---|---|---|
| EP | 3296844 A1 | 3/2018 |
| JP | 2018055733 A | 4/2018 |
| WO | 2016181539 A1 | 11/2016 |

OTHER PUBLICATIONS

Unknown., "Intouch Enables Data Transfer Data Between Mobile Screens Using a Miniature Device", Oct. 2013, 7 pages.
Unknown, "Tagtal tStylus lets you transfer data between device screens", Aug. 19, 2013, 7 pages.
Govers III, F., "inTouch tech allows files to be transferred between devices with a touch", Nov. 19, 2013, 8 pages.

* cited by examiner

*Primary Examiner* — Simon P Kanaan
(74) *Attorney, Agent, or Firm* — Stosch Sabo

(57) ABSTRACT

A roller-shaped electronic stamp comprising a plurality of protrusions arranged on a surface of a cylindrical rotational body that rotates around a shaft, wherein a pattern of contact points provided by the plurality of protrusions represents data, and wherein the data is transmitted to an electronic terminal by rolling the surface of the cylindrical rotational body on a touchscreen of the electronic terminal.

25 Claims, 10 Drawing Sheets

ROLLER-SHAPED ELECTRONIC STAMP

BACKGROUND

The present disclosure relates to secure data transfer, and, more specifically, to a roller-shaped electronic stamp for secure data transfer.

Portable electronic stamps are traditionally used in applications involving the rapid transmission of small amounts of data between the portable electronic stamp and a user device when the portable electronic stamp is contacting the user device. For example, portable electronic stamps can be used to authenticate electronic tickets to sporting events, concerts, and the like. As another example, portable electronic stamps can be used to validate electronic vouchers.

Traditional portable electronic stamps that are used in the above example applications can include a face that is pressable to an interface of an electronic device, where the face includes components capable of transmitting a limited amount of information to the electronic device. The limited amount of information may be used to manipulate a virtual asset such as a ticket, a voucher, or the like.

However, the amount of data that current portable electronic stamps transmit is a function of the size of the portable electronic stamp. Thus, a larger portable electronic stamp capable of transmitting more data would also be incompatible with many smaller devices (e.g., smartphones) while also being difficult to handle and manipulate by a user. Thus, there is a need to create portable electronic stamps that are capable of storing sufficient data so as to be useful for any number of applications benefiting from rapid transmission of data during physical contact.

SUMMARY

Aspects of the present disclosure are directed toward a roller-shaped electronic stamp comprising a plurality of protrusions arranged on a surface of a cylindrical rotational body that rotates around a shaft. A pattern of contact points that is provided by the plurality of protrusions represents data, and the data is transmitted to an electronic terminal by rolling the surface of the cylindrical rotational body on a touchscreen of the electronic terminal.

The roller-shaped electronic stamp described above exhibits numerous improvements and advantages over the state of the art such as, for example, the roller-shaped electronic stamp can store more data than a similarly sized electronic stamp by including transmittable data around a cylindrical rotational body.

Another aspect of the roller-shaped electronic stamp described above includes the data comprising key information for encrypting and decrypting files. Advantageously, communicating key information using the roller-shaped electronic stamp can promote secure data transfer insofar as key information that is transmitted by physically rolling the roller-shaped electronic stamp on a touchscreen of an electronic terminal is difficult for a malicious actor to intercept and/or steal.

Another aspect of the roller-shaped electronic stamp described above includes the data comprising a short-range communication protocol for establishing a short-range network with at least one other electronic terminal. Advantageously, communicating a short-range communication protocol using the roller-shaped electronic stamp can enable two or more electronic terminals to communicate using a secure, peer-to-peer network, where the parameters for accessing the secure, peer-to-peer network are difficult to intercept insofar as the parameters are transmitted to the respective electronic terminals by rolling the roller-shaped electronic stamp on respective touchscreens of the respective electronic terminals.

Another aspect of the roller-shaped electronic stamp described above includes the data comprising a uniform resource locator (URL) of a server. Advantageously, the server can function as an intermediary for sharing data between electronic terminals otherwise lacking a secure, direct connection. Thus, privately sharing the URL of the server by rolling the roller-shaped electronic stamp on an interface of the electronic terminal can function as a security mechanism for limiting access to the server. As discussed above, the URL of the server is difficult to intercept or otherwise steal when the URL is transmitted to electronic terminals using the roller-shaped electronic stamp.

Another aspect of the roller-shaped electronic stamp described above includes the pattern of contact points being configured to represent at least 112 bits of data. Advantageously, robust encryption schemes can utilize at least 112 bits of data, and current electronic stamps can lack the capacity to transmit this amount of data.

Another aspect of the roller-shaped electronic stamp described above includes the pattern of contact points having a calibration column with active contact points in each cell of the calibration column, and where the calibration column indicates a separation distance of longitudinally adjacent contact points. Advantageously, this aspect of the present disclosure improves transmission fidelity of the transferred data by providing a designated portion of the pattern of contact points for ascertaining cell spacing as a cylindrical rotational body of the roller-shaped electronic stamp is rolled on a touchscreen of an electronic terminal. In other words, this aspect of the present disclosure can determine that a designated cell is, in fact, an inactive cell if it is not activated at a same or similar time as a cell in the same row as the designated cell and located in the calibration column is active.

Another aspect of the roller-shaped electronic stamp described above includes the pattern of contact points having a sequencing pattern comprising a predetermined pattern of active contact points that indicate a sequence of the pattern of contact points. Advantageously, this aspect of the present disclosure improves transmission fidelity of the transferred data by enabling an electronic terminal receiving data from the roller-shaped electronic stamp to properly sequence the received data.

Additional aspects of the present disclosure are directed toward a method comprising receiving key information at a first electronic terminal by rolling a roller-shaped electronic stamp on a first touchscreen of the first electronic terminal. The method further comprises broadcasting, by the first electronic terminal, a message that the first electronic terminal can receive data via short-range communication. The method further comprises receiving, at the first electronic terminal and from a second electronic terminal via the short-range communication, a file encrypted using the key information.

Advantageously, the aforementioned aspect of the present disclosure improves data transmission security by providing key information to electronic terminals using the roller-shaped electronic stamp. Providing key information to electronic terminals using the roller-shaped electronic stamp reduces a malicious actor's ability to steal, corrupt, intercept, or otherwise compromise encryption-related information.

Additional aspects of the present disclosure are directed toward a method comprising receiving key information and universal resource locator (URL) information of a server at a first electronic terminal by rolling a roller-shaped electronic stamp on a first touchscreen of the first electronic terminal. The method further comprises transmitting data encrypted using the key information from the first electronic terminal to the server according to the URL information, where the server is used as an intermediary for sharing data between the first electronic terminal and a second electronic terminal.

Advantageously, the aforementioned aspect of the present disclosure improves data transmission security by providing key information to electronic terminals using the roller-shaped electronic stamp. Providing key information to electronic terminals using the roller-shaped electronic stamp reduces a malicious actor's ability to steal, corrupt, intercept, or otherwise compromise encryption-related information. Furthermore, the aforementioned aspect of the present disclosure improves data transfer between electronic terminals otherwise lacking a secure, direct connection insofar as the server can be used as an intermediary for transferring files between disconnected electronic terminals. This strategy also exhibits improved security insofar as the URL of the server is transmitted to electronic terminals using the roller-shaped electronic stamp, thereby making the URL of the server difficult to steal, corrupt, intercept, or otherwise compromise for the same reasons discussed above regarding the key information.

Additional aspects of the present disclosure are directed toward a method comprising transmitting a short-range communication protocol from a roller-shaped electronic stamp to a first electronic terminal by rolling the roller-shaped electronic stamp on a touchscreen of the first electronic terminal. The method further comprises establishing a short-range network between the roller-shaped electronic stamp and the first electronic terminal in response to rolling the roller-shaped electronic stamp on the touchscreen of the first electronic terminal. The method further comprises transmitting data from the roller-shaped electronic stamp to the first electronic terminal via the short-range network in response to establishing the short-range network.

Advantageously, the aforementioned aspect of the present disclosure improves data transmission security by providing a short-range communication protocol to electronic terminals using the roller-shaped electronic stamp. Providing the short-range communication protocol to electronic terminals using the roller-shaped electronic stamp reduces a malicious actor's ability to intercept the short-range communication protocol, thereby hampering a malicious actor's ability to intercept information communicated using the short-range communication protocol.

Additional aspects of the present disclosure are directed toward a method comprising transmitting a short-range communication protocol to a first electronic terminal by rolling a roller-shaped electronic stamp on a touchscreen of the first electronic terminal. The method further comprises establishing short-range communication between the roller-shaped electronic stamp and the first electronic terminal in response to rolling the roller-shaped electronic stamp on the touchscreen of the first electronic terminal. The method further comprises receiving a file from the first electronic terminal at the roller-shaped electronic stamp via the short-range communication in response to establishing the short-range communication, where the roller-shaped electronic stamp is used as an intermediary for transferring the file to a second electronic terminal.

Advantageously, the aforementioned aspect of the present disclosure enables the roller-shaped electronic stamp to function as a secure intermediary for data transfer between two or more electronic terminals otherwise lacking a secure, direct electronic connection.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
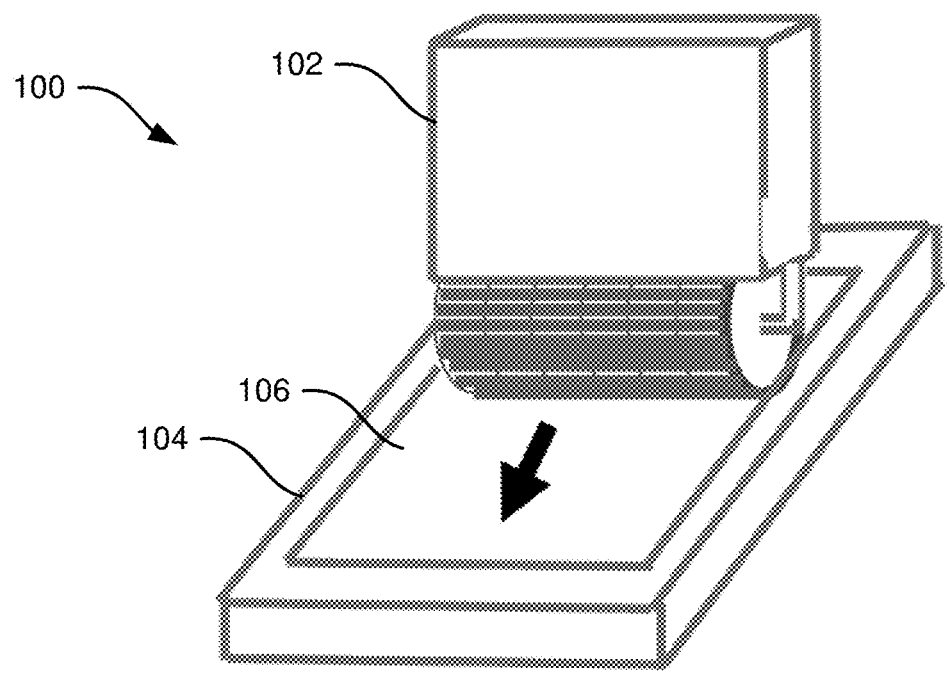
FIG. 1A illustrates a secure data transfer environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward secure data transfer, and, more specifically, to a roller-shaped electronic stamp for secure data transfer. While not limited to such applications, embodiments of the present disclosure may be better understood in light of the aforementioned context.

FIG. 1A illustrates a secure data transfer environment 100, in accordance with some embodiments of the present disclosure. The secure data transfer environment 100 can include a roller-shaped electronic stamp 102 that is configured to transfer data to an electronic terminal 104 (e.g., a smartphone, a tablet, or another electronic device having a user interface) by a pattern of signals applied to an interface 106 of the electronic terminal 104. In some embodiments, the roller-shaped electronic stamp 102 transfers data such as key information (e.g., for encrypting and decrypting data), server information (e.g., a Uniform Resource Locator (URL) of a server), and/or a short-range communication protocol (e.g., for securely communicating in a peer-to-peer (P2P) network). Key information and/or server information can be transmitted from the roller-shaped electronic stamp 102 to the electronic terminal 104 based on information contained in a pattern of signals (e.g., contact points, electrical signals, etc.) contained on a cylindrical rotational body of the roller-shaped electronic stamp 102 and detectable by the interface 106 of the electronic terminal 104.

Figure 1B:
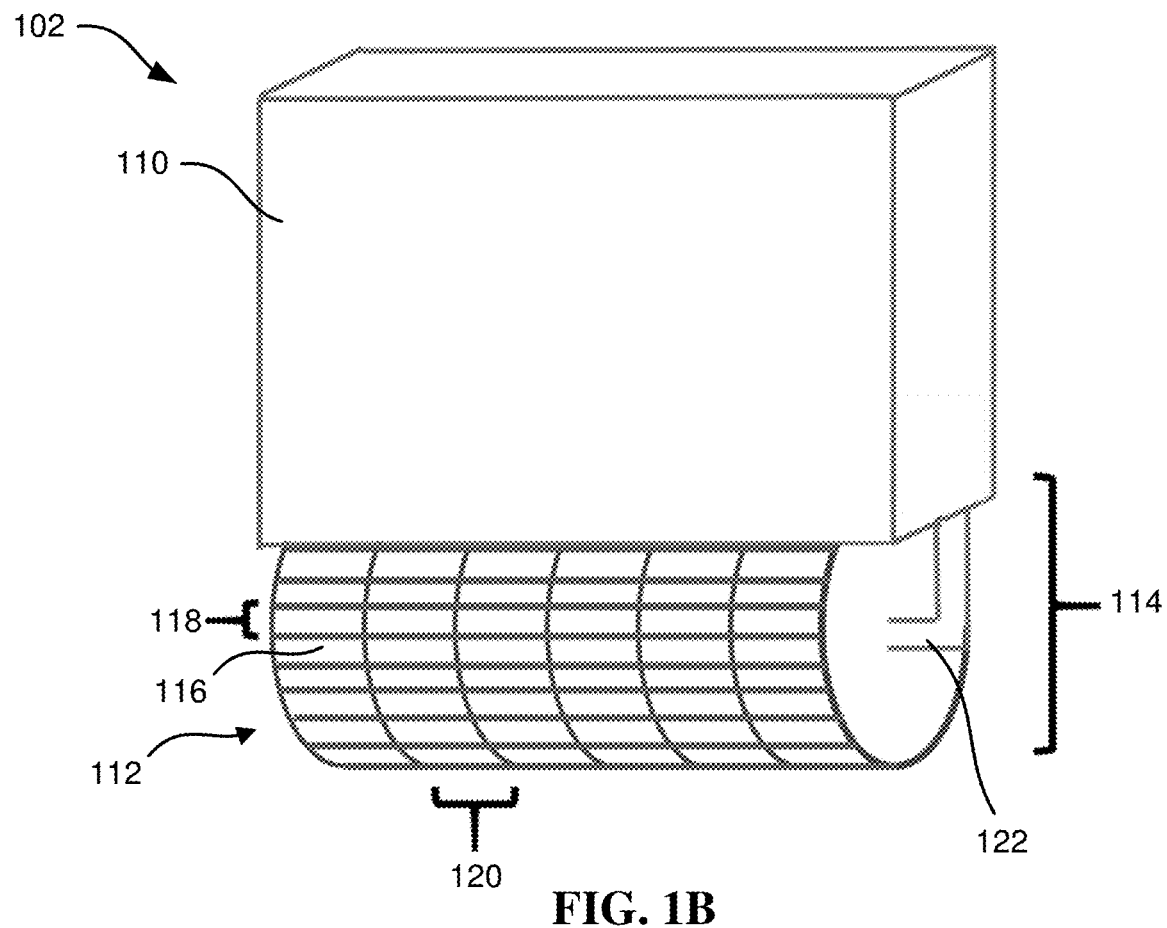
FIG. 1B illustrates a roller-shaped electronic stamp for facilitating secure data transfer, in accordance with some embodiments of the present disclosure.

FIG. 1B illustrates a more detailed view of the roller-shaped electronic stamp 102, in accordance with some embodiments of the present disclosure. The roller-shaped electronic stamp 102 can include a housing 110, a cylindrical rotational body 112, and a shaft 122 connecting the cylindrical rotational body 112 to the housing 110, and where the cylindrical rotational body 112 is rotatable about the shaft 122 when the roller-shaped electronic stamp 102 is translated with the cylindrical rotational body 112 contacting an interface 106 of an electronic terminal 104. The housing 110 can function as a grip by which a user can press the roller-shaped electronic stamp 102 to an interface 106 of an electronic terminal 104 and roll the roller-shaped electronic stamp 102 along the interface 106 of the electronic terminal 104 so that information can be transmitted from the cylindrical rotational body 112 of the roller-shaped electronic stamp 102 to the electronic terminal 104 via the interface 106.

The cylindrical rotational body 112 can be characterized by a diameter 114. In some embodiments, the diameter 114 is approximately 30 millimeters (mm) (1.18 inches (in)). As used herein, approximately can refer to the reference dimension plus or minus 10% of the reference dimension. Thus, in embodiments where the diameter 114 is approximately 30 mm (1.18 in), the diameter 114 can range between 27 mm (1.06 in) and 33 mm (1.30 in) inclusive while remaining within the definition of approximately 30 mm (1.18 in). In other embodiments, the diameter 114 is less than 30 mm (1.18 in), greater than 30 mm (1.18 in), or between 25 mm (0.98 in) and 100 mm (3.94 in), inclusive.

The cylindrical rotational body 112 is made up of a plurality of cells 116. In some embodiments, the plurality of cells 116 are approximately equally sized and are associated with a length 120 (where the length 120 can be measured along an axis that is parallel to the shaft 122) and a width 118 (where the width 118 can be measured around a circumference of the cylindrical rotational body 112). In some embodiments, the length 120 is approximately 10 mm (0.39 in) and the width 118 is approximately 4 mm (0.16 in). Accordingly, in some embodiments, respective cells 116 can have an area of approximately 40 $mm^2$ (0.062 $in^2$).

In some embodiments, the length 120 is less than 10 mm (0.39 in), greater than 10 mm (0.39 in), or between 5 mm (0.20 in) and 20 mm (0.79 in), inclusive. In some embodiments, the width 118 is less than 4 mm (0.16 in), greater than 4 mm (0.16 in), or between 2 mm (0.08 in) and 10 mm (0.40 in), inclusive.

Advantageously, when the roller-shaped electronic stamp 102 is dimensioned such that the diameter 114 of the cylindrical rotational body 112 is approximately 30 mm (1.18 in), the width 118 of the plurality of cells 116 is approximately 4 mm (0.16 in), and the length 120 of the plurality of cells 116 is approximately 10 mm (0.39 in), the roller-shaped electronic stamp 102 is capable of accurately transmitting at least 112 bits of information. This amount of transferrable information is advantageous insofar as 112 bits can provide sufficient key information for robust data encryption, while the dimensioning of the plurality of cells 116 is sufficient to promote accurate data transmission insofar as smaller cells 116 can be difficult to distinguish from one another by current interface technology.

Figure 2A:
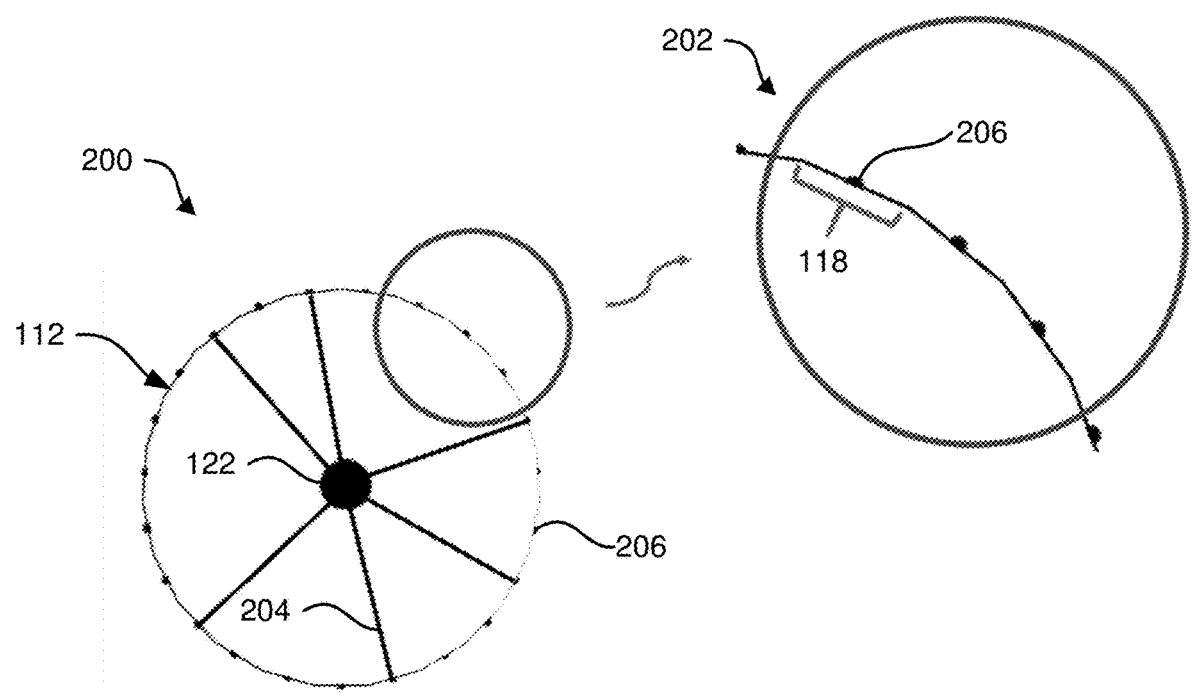
FIG. 2A illustrates a cross-sectional view and a closer cross-sectional view of a cylindrical rotational body of a roller-shaped electronic stamp, in accordance with some embodiments of the present disclosure.

FIG. 2A illustrates a cross-sectional view 200 and a closer cross-sectional view 202 of the cylindrical rotational body 112, in accordance with some embodiments of the present disclosure. In the cross-sectional view 200, the cylindrical rotational body 112 and the shaft 122 are visible as previously discussed. Cross-sectional view 200 further illustrates activation paths 204 and protrusions 206. Activation paths 204 can be conductive or mechanical. When conductive, the activation paths 204 can transmit electricity to a respective protrusion 206 causing the respective protrusion 206 to be considered an activated cell 116, where the transmitted electricity can cause the respective protrusion 206 to be electrified (thereby indicating activation) or where the transmitted electricity can actuate a mechanical mechanism for raising the protrusion 206 to a height such that its mechanical contact with an interface 106 is registered by the interface 106.

Although electrical and mechanical stimuli are discussed above, other stimuli can also be used and fall within the spirit and scope of the present disclosure. For example, optical stimuli (e.g., light intensity, light frequency), laser stimuli (e.g., laser intensity, laser frequency), air pulses (e.g., a brief burst of air for replicating a tactile stimulus without physical contact), and/or other stimuli are within the spirit and scope of the present disclosure.

Closer cross-sectional view 202 shows the protrusion 206 and the width 118. As can be seen, the width 118 is greater than the protrusion 206. For example, in some embodiments, the protrusion 206 is a hemispherical protrusion, where the hemispherical protrusion has a height (e.g., where the height is measured as a distance extending orthogonal to the surface of the cylindrical rotational body 112) of approximately 0.25 mm (0.01 in). In some embodiments, the height of the protrusion 206 is less than 0.25 mm (0.01 in), greater than 0.25 mm (0.01 in), or between 0.10 mm (0.004 in) and 1 mm (0.04 in), inclusive. In some embodiments, the area around the protrusion 206 is made up of insulative material, such that any electrification of the protrusion 206 is isolated from other protrusions 206 by the insulative material buffering each protrusion 206.

Advantageously, in embodiments where the protrusion 206 protrudes approximately 0.25 mm (0.01 in), the likelihood of signal interference by two longitudinally adjacent cells (e.g., cells adjacent about the circumference of the cylindrical rotational body 112) is reduced. In other words, for protrusions that measure approximately 0.25 mm in height, for a first protrusion 206 contacting the interface 106, while rolling the cylindrical rotational body 112 to a next protrusion 206 directly above the first protrusion 206, the next protrusion 206 will not contact the interface 106 until the first protrusion 206 has stopped contacting the interface 106. Thus, this benefit improves data transmission fidelity.

Figure 2B:
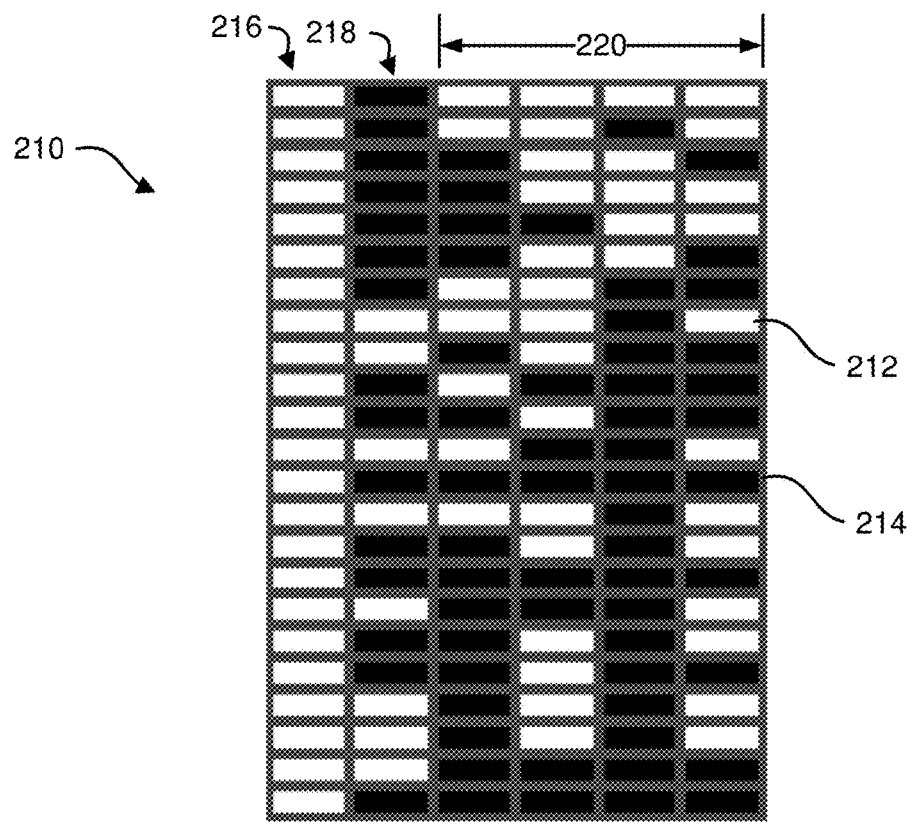
FIG. 2B illustrates an example pattern of contact points generated by a cylindrical rotational body of a roller-shaped electronic stamp, in accordance with some embodiments of the present disclosure.

FIG. 2B illustrates an example pattern of contact points 210, in accordance with some embodiments of the present disclosure. The pattern of contact points 210 is an example pattern that is illustrated as an "unwrapped" cylindrical rotational body 112 presented in rectangular format. The pattern of contact points 210 shown in FIG. 2B includes six columns and twenty-three rows, but this is only an example and more or fewer columns and/or rows are possible in other embodiments. The pattern of contact points 210 is made up of a plurality of cells 116 including activated cells 212 (white) and inactive cells 214 (black). Patterns of activated cells 212 and inactive cells 214 can be used to transmit binary data. Activated cells 212 can be associated with a stimulus that is detectable by the interface 106 such as a mechanical stimulus, electrical stimulus, optical stimulus, tactile stimulus, or another stimulus. In contrast, inactive cells 214 can be associated with no stimulus, or, alternatively, a different type of stimulus (e.g., a different power of an electrical stimulus, a different frequency of an optical stimulus, etc.).

The pattern of contact points 210 further includes a calibration column 216 of exclusively activated cells 212. The calibration column 216 can be useful for enabling an electronic terminal 104 to determine a distance between consecutive cells 116 in the rolling direction.

The pattern of contact points 210 further includes a sequencing pattern 218 of both activated cells 212 and/or inactive cells 214. The sequencing pattern 218 can be used to correctly sequence the pattern of contact points 210 received at the electronic terminal 104. For example, when the roller-shaped electronic stamp 102 is applied to the interface 106, the initial portion of the pattern of contact points 210 transmitted to the electronic terminal 104 may be a beginning, middle, end, or another portion of the pattern of contact points 210. By having a sequencing pattern 218, the electronic terminal 104 can accurately organize the transmitted data regardless of the order it is received when rolling the cylindrical rotational body 112 of the roller-shaped electronic stamp 102 on the interface 106. Although the sequencing pattern 218 is shown as a column, the sequencing pattern 218 could also be one or more rows, or an area comprised of respective portions of multiple rows and/or multiple columns, in other embodiments.

The pattern of contact points 210 further includes transmittable data 220. Transmittable data 220 are the cells 116 that are not part of the calibration column 216 or the sequencing pattern 218. Transmittable data 220 can be used to represent key information, server information, and/or short-range communication protocol information, as discussed in more detail hereinafter.

Transmittable data 220 can use any protocol, now known or later developed, for converting binary data (e.g., combinations of active cells 212 and inactive cells 214) into consumable information, such as key information, server information, and/or short-range communication protocol information.

Advantageously, the pattern of contact points 210 is transmitted to the interface 106 of the electronic terminal 104 over a period of time while rolling the cylindrical rotational body 112 on the interface 106. As is understood by one skilled in the art, interfaces 106 are associated with limits on how many simultaneous inputs they can receive. Whereas, a traditional portable electronic stamp conveys all its information simultaneously when pressing the traditional portable electronic stamp to the interface 106, the roller-shaped electronic stamp 102 conveys its information incrementally while rolling the cylindrical rotational body 112 on the interface 106. Thus, the roller-shaped electronic stamp 102 can convey more information in each "row" of the cylindrical rotational body 112 that contacts the interface 106 insofar as the roller-shaped electronic stamp 102 can capitalize on the maximum number of simultaneous inputs associated with the interface 106 for each row rather than having the maximum number of simultaneous inputs function as a limiting factor for the entire pattern of contact points 210 (as is the case in traditional portable electronic stamps).

Figure 3A:
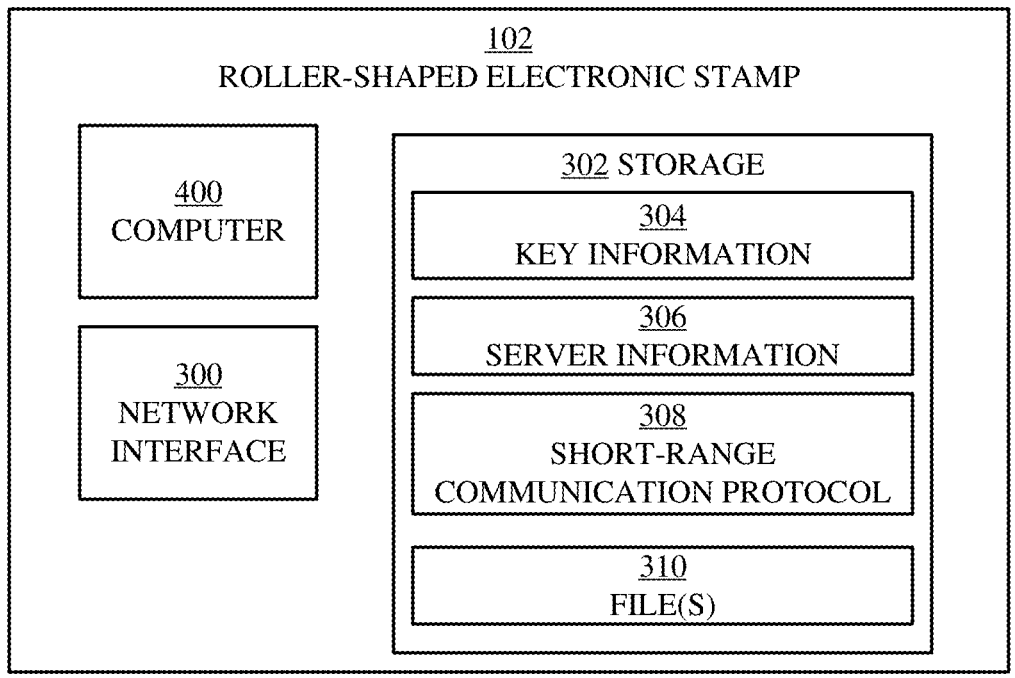
FIG. 3A illustrates example data processing components of a roller-shaped electronic stamp, in accordance with some embodiments of the present disclosure.

FIG. 3A illustrates example data processing components of an example roller-shaped electronic stamp 102, in accordance with some embodiments of the present disclosure. The roller-shaped electronic stamp 102 can include, for example, a computer 400 (discussed in more detail hereinafter with respect to FIG. 4), a network interface 300 for communicating with electronic terminals 104 or servers via a private or public network, and storage 302. The storage 302 can be any type of storage now known or later developed such as, but not limited to, a hard disk drive (HDD), flash memory, a Universal Serial Bus (USB), or another computer-readable storage medium. The storage 302 can contain one or more of key information 304, server information 306, short-range communication protocol 308, and/or files 310.

Key information 304 can relate to public and/or private key information that is used to encrypt and/or decrypt information, such as files 310. Key information 304 can be, for example, between 80 bits and 128 bits, or, in some embodiments, greater than or less than 128 bits. The key information 304 can include one or more of: symmetric key(s), asymmetric key(s), public key(s), and/or private key(s).

Server information 306 can include a uniform resource locator (URL) of a server. In some embodiments, the URL is less than or equal to 16 characters (e.g., 16 bytes or 128 bits). In some embodiments, the URL is less than or equal to 2,000 characters (e.g., 2,000 bytes or 16,000 bits). In some embodiments, the server information 306 includes an Internet Protocol (IP) address. An IP address can be a 32-bit number (e.g., Internet Protocol version 4 (IPv4)), a 128-bit number (e.g., Internet Protocol version 6 (IPv6)), or another amount of data.

Short-range communication protocol 308 can refer to any amount of information relevant to any number of short-range communication protocols for the purposes of establishing secure, short-range communication with one or more designated devices. Short-range communication protocols can include, but are not limited to, networks utilizing Institute of Electrical and Electronics Engineers (IEEE) 802.15 standards, IEEE 1902.1 standards, personal area networks (PAN), peer-to-peer (P2P) networks, Bluetooth™ networks, Near Field Communication (NFC) networks, Infrared Data Association (IrDA) networks, Internet Protocol version 6 (IPv6) over Low-Power Wireless Personal Area Networks (6LoWPAN), DASH7 Alliance Protocol (D7A) networks, RuBee networks, Ultra-wideband (UWB) networks, Frequency Modulation (FM)-UWB networks, Wireless Ad Hoc Networks (WANET), Z-Wave networks, ZigBee™ networks, and other short-range networks, communication protocols, and the like. Obviously, the short-range communication protocol 308 need not contain the entirety of any particular short-range communication protocol, but may instead contain an indication of a type of short-range communication protocol to use, a time to use it, and/or a device to connect to using a predetermined short-range communication protocol, among other possible information.

Files 310 can be any type of file such as, for example, text files, document files, audio files, video files, and/or other files. Files 310 may be too large to transmit using the cylindrical rotational body 112, and so the cylindrical rotational body 112 is used to transmit one or more of key information 304, server information 306, and/or short-range communication protocol 308 useful for establishing a secure environment in which to transfer files 310 to an electronic terminal 104 (or between two or more electronic terminals 104).

Figure 3B:
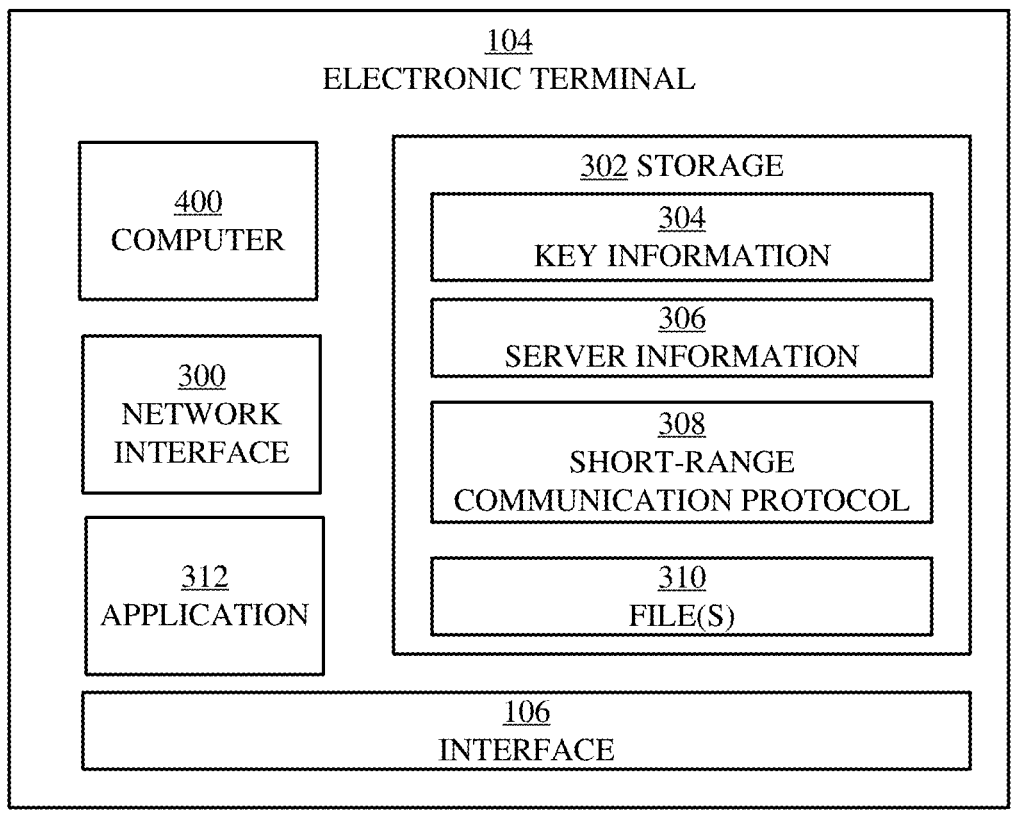
FIG. 3B illustrates example data processing components of an electronic terminal, in accordance with some embodiments of the present disclosure.

FIG. 3B illustrates example data processing components of an electronic terminal 104 (also referred to as an electronic device, a user device, a user terminal, or a data processing device). Electronic terminal 104 can include a computer 400 (as discussed in further detail hereinafter with respect to FIG. 4), a network interface 300 (as discussed above), and storage 302 (as discussed above) storing one or more of key information 304, server information 306, short-range communication protocol 308 and/or files 310. In some embodiments, the electronic terminal 104 receives key information 304, server information 306, and/or short-range communication protocol 308 from the roller-shaped electronic stamp 102 in response to rolling the cylindrical rotational body 112 on an interface 106 of the electronic terminal 104. In some embodiments, the electronic terminal 104 uses the received key information 304 to encrypt files 310 and transfer the encrypted files 310 to another electronic terminal 104. In some embodiments, the electronic terminal 104 uses the server information 306 to transmit the files 310 (whether or not encrypted using key information 304) to the server so that another electronic terminal 104 can access the files 310 via the server. In some embodiments, the roller-shaped electronic stamp 102 transfers files 310 to (or receives files 310 from) another electronic terminal 104 according to the short-range communication protocol 308. In yet other embodiments, the electronic terminal 104 transmits files 310 to (or receives files 310 from) another electronic terminal 104 according to the short-range communication protocol 308.

The electronic terminal 104 can further include interface 106. Interface 106 can be, for example, a touchscreen, a touch panel, a tactile interface, or another interface that can detect the pattern of contact points 210 generated by the roller-shaped electronic stamp 102. In some embodiments, the interface 106 can present information to a user and receive information from a user or the roller-shaped electronic stamp 102.

The electronic terminal 104 can also include an application 312, where the application 312 can be configured to receive the pattern of contact points 210 from the roller-shaped electronic stamp 102 and convert the pattern of contact points 210 into one or more of the key information 304, the server information 306, and/or the short-range communication protocol 308. In other words, the application 312 can be configured to convert data represented by active cells 212 and inactive cells 214 into useful data for securely transmitting files 310 between electronic terminals 104 or between an electronic terminal 104 and the roller-shaped electronic stamp 102. Thus, application 312 can contain program instructions configured to cause the electronic terminal 104 to utilize information received from the roller-shaped electronic stamp 102 via the interface 106.

In all these embodiments, the roller-shaped electronic stamp 102 can be used to facilitate the transfer of files 310 amongst one or more electronic terminals 104, where the cylindrical rotational body 112 of the roller-shaped electronic stamp 102 is rolled on the interface 106 of each of the one or more electronic terminals 104 transferring the files 310.

Figure 4:
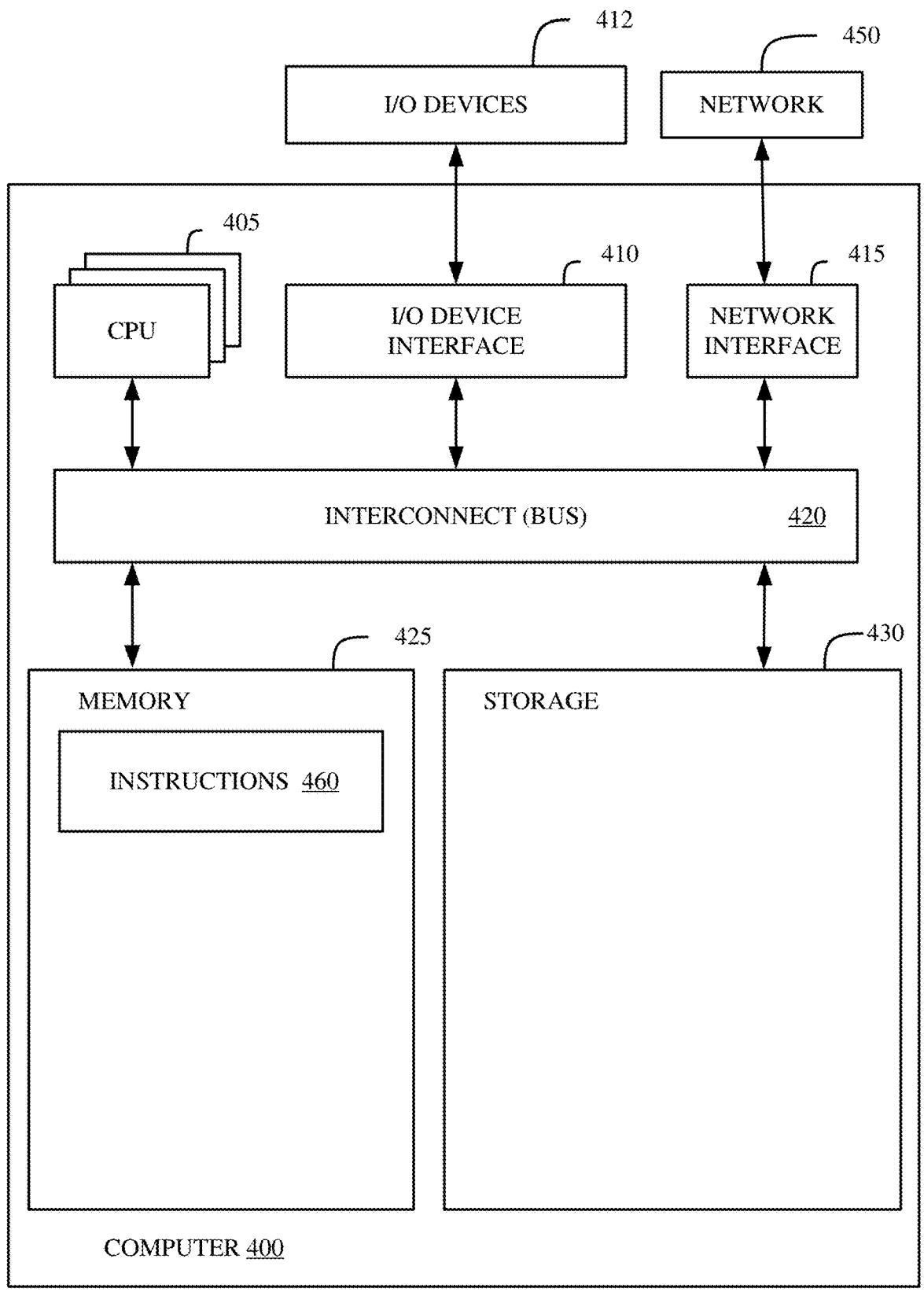
FIG. 4 illustrates a block diagram of an example computer that may be included, in whole or in part, in a roller-shaped electronic stamp and/or an electronic terminal, in accordance with some embodiments of the present disclosure.

FIG. 4 illustrates a block diagram of an example computer 400 in accordance with some embodiments of the present disclosure. In various embodiments, computer 400 can perform the methods described herein and/or implement any of the functionality discussed herein. In some embodiments, computer 400 receives instructions related to the aforementioned methods and/or functionalities by downloading processor-executable instructions from a remote data processing system via a network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the roller-shaped electronic stamp 102, the electronic terminal 104, or another aspect of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer-based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random-access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, any of the methods discussed herein and/or implementing any of the functionality discussed herein. In some embodiments, instructions 460 include instructions for converting key information 304, server information 306, and/or short-range communication protocol 308 into a pattern of contact points 210 (e.g., when computer 400 is incorporated into the roller-shaped electronic stamp 102). In some embodiments, instructions 460 include instructions for converting a pattern of contact points 210 received at an interface 106 into key information 304, server information 306, and/or short-range communication protocol 308 (e.g., when computer 400 is incorporated into an electronic terminal 104). Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

Figure 5A:
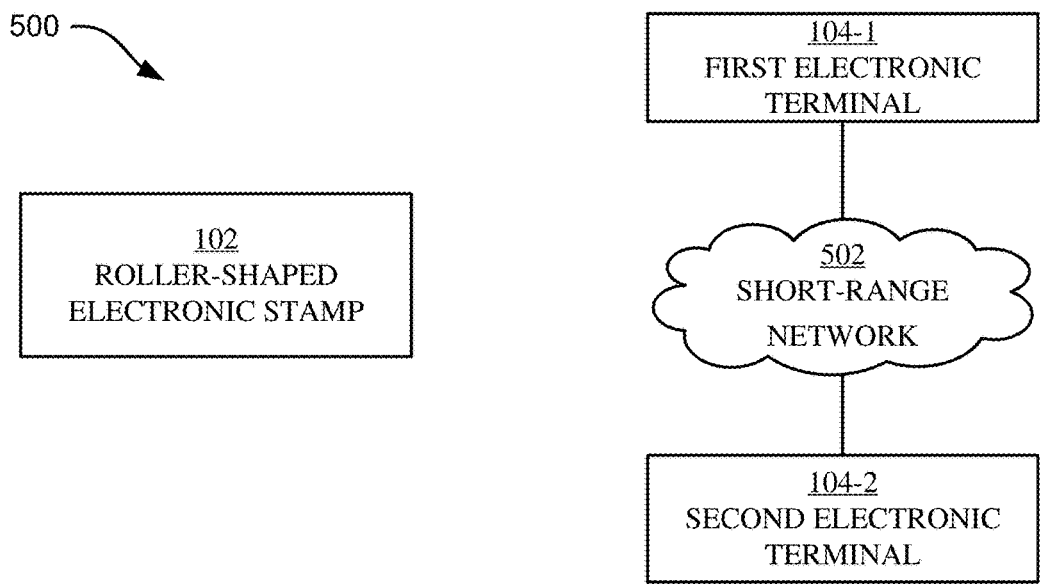
FIG. 5A illustrates a block diagram of an example first system, in accordance with some embodiments of the present disclosure.

FIG. 5A illustrates a first system 500, in accordance with some embodiments of the present disclosure. The first system 500 includes the roller-shaped electronic stamp 102 and a first electronic terminal 104-1 communicatively coupled to a second electronic terminal 104-2 by a short-range network 502. In the first system 500, the roller-shaped electronic stamp 102 can transmit data (e.g., key information 304, short-range communication protocol 308) to each of the first electronic terminal 104-1 and the second electronic terminal 104-2 be separately rolling the cylindrical rotational body 112 on respective interfaces 106 of both the first electronic terminal 104-1 and the second electronic terminal 104-2. After transmitting data to each of the first electronic terminal 104-1 and the second electronic terminal 104-2, the first electronic terminal 104-1 and the second electronic terminal 104-2 can establish the short-range network 502. After establishing the short-range network 502, the first electronic terminal 104-1 and the second electronic terminal 104-2 can exchange data (e.g., files 310) with one another via the short-range network 502. In some embodiments, the exchanged data is encrypted and decrypted according to the key information 304.

Figure 5B:
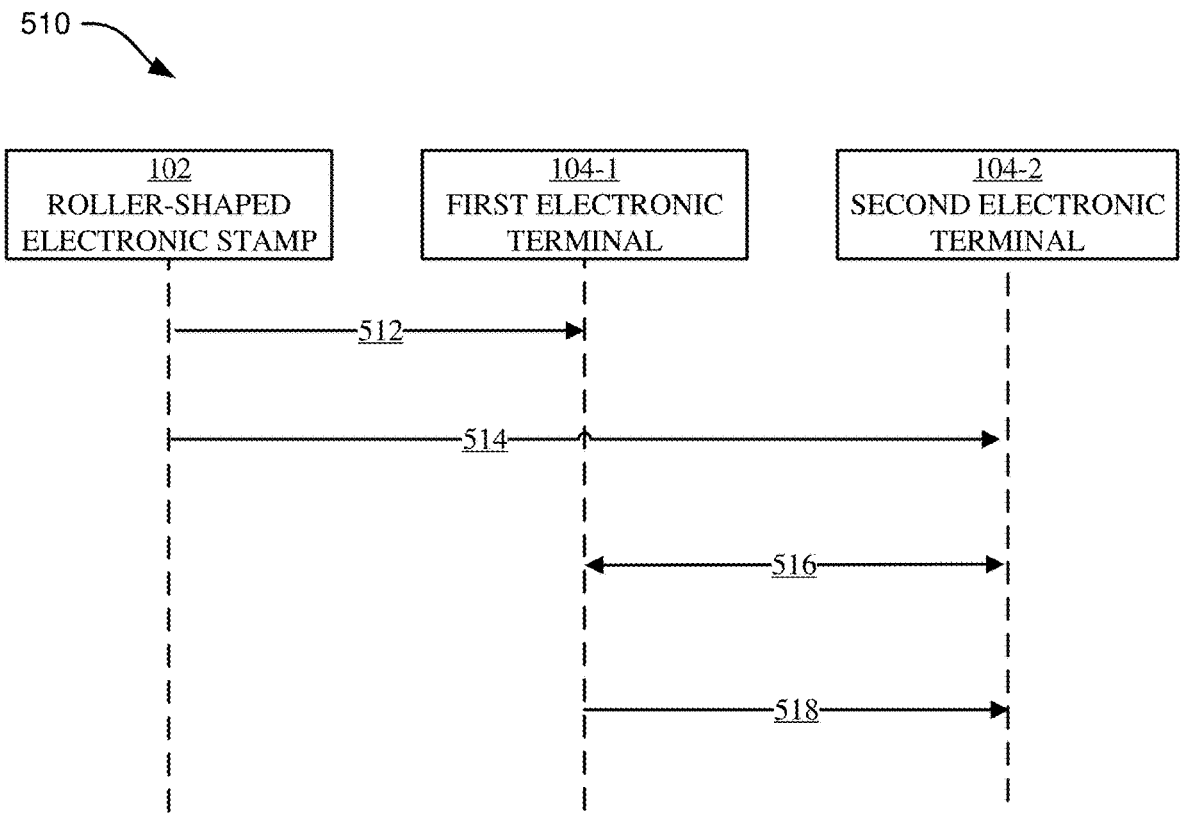
FIG. 5B illustrates an example first data flow diagram illustrating interactions between components in the first system, in accordance with some embodiments of the present disclosure.

FIG. 5B illustrates a first data flow diagram 510 according to the first system 500, in accordance with some embodiments of the present disclosure. At operation 512, the roller-shaped electronic stamp 102 can transmit one or more of key information 304 and/or short-range communication protocol 308 to the first electronic terminal 104-1 by rolling the roller-shaped electronic stamp 102 on an interface of the first electronic terminal 104-1. In other words, the pattern of contact points 210 can be configured to contain one or more of the key information 304 and/or the short-range communication protocol 308.

At operation 514, the roller-shaped electronic stamp 102 can transmit one or more of key information 304 and/or short-range communication protocol 308 to the second electronic terminal 104-2 by rolling the roller-shaped electronic stamp 102 on an interface of the second electronic terminal 104-2.

At operation 516, the first electronic terminal 104-1 and the second electronic terminal 104-2 can establish short-range network 502 for communication with one another according to the short-range communication protocol 308. In some embodiments, the first electronic terminal 104-1 and the second electronic terminal 104-2 utilize the short-range communication protocol 308 for establishing the short-range network 502.

At operation 518, the first electronic terminal 104-1 transmits data (e.g., files 310) to the second electronic terminal 104-2 using the short-range network 502. In some embodiments, the transmitted data is encrypted using the key information 304. In some embodiments, operation 518 includes decrypting, at the second electronic terminal 104-2, the encrypted transmitted data using the key information 304.

Figure 6:
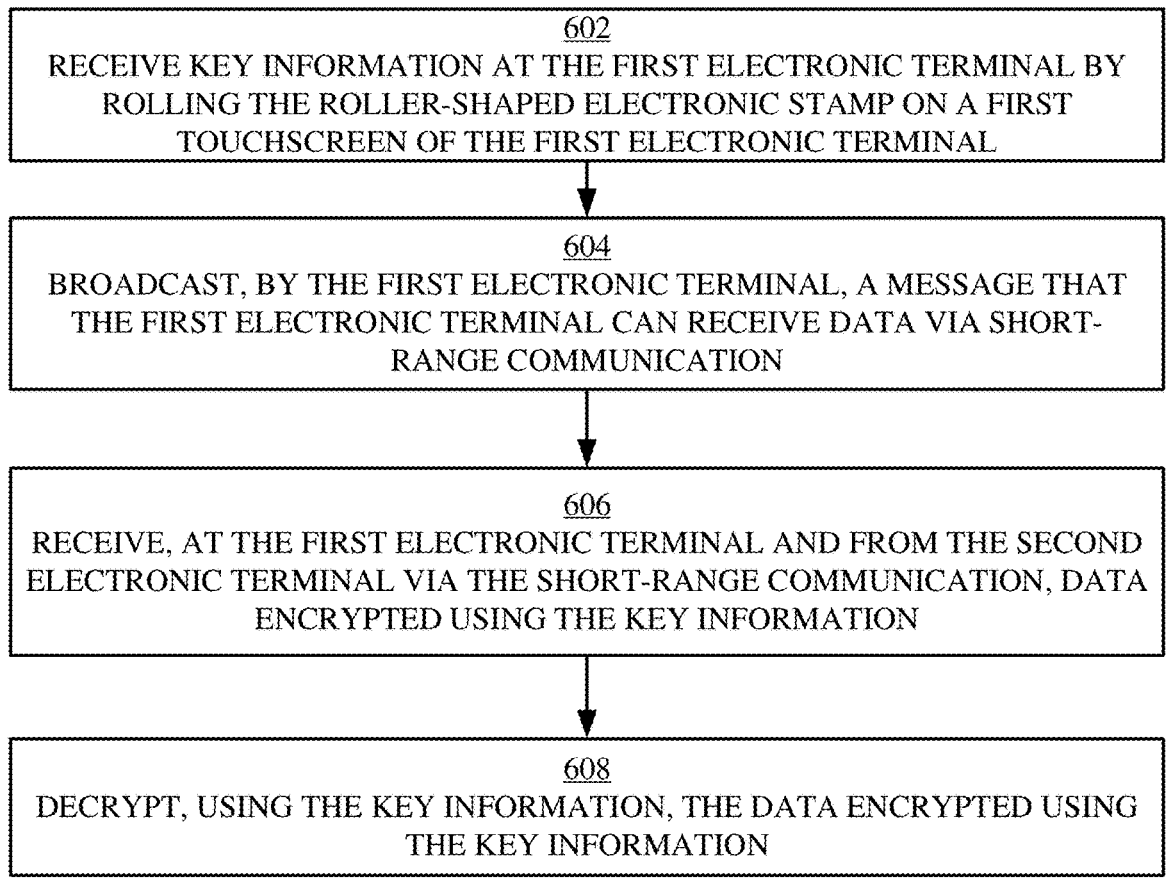
FIG. 6 illustrates a flowchart of an example first method for securely transferring data between electronic terminals using the roller-shaped electronic stamp, in accordance with some embodiments of the present disclosure.

FIG. 6 illustrates a flowchart of a first method 600 for transmitting data between electronic terminals 104 based on data received from a roller-shaped electronic stamp 102, in accordance with some embodiments of the present disclosure. In some embodiments, the first method 600 is implemented by an electronic terminal 104, a computer 400, or another configuration of hardware and/or software.

Operation 602 includes receiving key information at a first electronic terminal 104-1 by rolling the roller-shaped electronic stamp 102 on a first touch panel of the first electronic terminal 104-1.

Operation 604 includes broadcasting, by the first electronic terminal 104-1, a message that the first electronic terminal 104-1 can receive data via short-range communication. In some embodiments, operation 604 includes establishing a short-range network 502 with the second electronic terminal 104-2.

Operation 606 includes receiving, at the first electronic terminal 104-1 and from the second electronic terminal 104-2 via the short-range network 502, data encrypted using the key information 304.

Operation 608 includes decrypting, using the key information 304 received from the roller-shaped electronic stamp 102, the data encrypted using the key information 304 and received from the second electronic terminal 104-2. In some embodiments, operation 608 further includes storing the decrypted data in a computer readable storage medium communicatively coupled to the first electronic terminal 104-1.

Figure 7A:
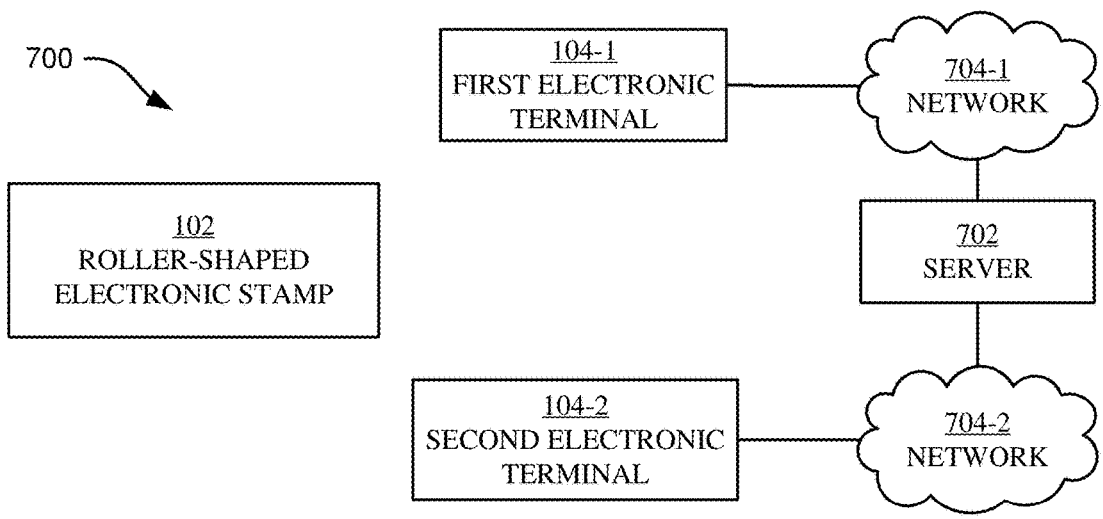
FIG. 7A illustrates a block diagram of an example second system, in accordance with some embodiments of the present disclosure.

FIG. 7A illustrates a second system 700, in accordance with some embodiments of the present disclosure. The second system 700 can include the roller-shaped electronic stamp 102, a first electronic terminal 104-1, a second electronic terminal 104-2, and a server 702. The first electronic terminal 104-1 can be connected to the server 702 by a first network connection 704-1 at a first time, and the second electronic terminal 104-2 can be connected to the server 702 by a second network connection 704-2 at a second time. The first time and the second time can be similar times, partially overlapping time intervals, or non-overlapping time intervals. In other words, the first electronic terminal 104-1 can be connected to the server 702 at a same or different time as the second electronic terminal 104-2 is connected to the server 702. Furthermore, the first network connection 704-1 and the second network connection 704-2 can be different networks or discrete accesses via a same network (e.g., discrete access points for connecting to the Internet).

In the second system 700, the roller-shaped electronic stamp 102 can be used to transmit server information 306 (e.g., a URL of the server 702) to the first electronic terminal 104-1 and the second electronic terminal 104-2 by rolling the roller-shaped electronic stamp 102 on respective interfaces of the first electronic terminal 104-1 and the second electronic terminal 104-2. In some embodiments, the roller-shaped electronic stamp 102 also transmits key information 304 to each of the first electronic terminal 104-1 and the second electronic terminal 104-2.

After transmitting at least the server information 306 to each of the first electronic terminal 104-1 and the second electronic terminal 104-2, each of the first electronic terminal 104-1 and the second electronic terminal 104-2 can access the server 702 for the purpose of uploading and/or downloading files 310 to/from the server 702. In other words, the first electronic terminal 104-1 and the second electronic terminal 104-2 can share files 310 using the server 702 as an intermediary. In some embodiments, the files 310 are encrypted and/or decrypted according to key information 304.

Figure 7B:
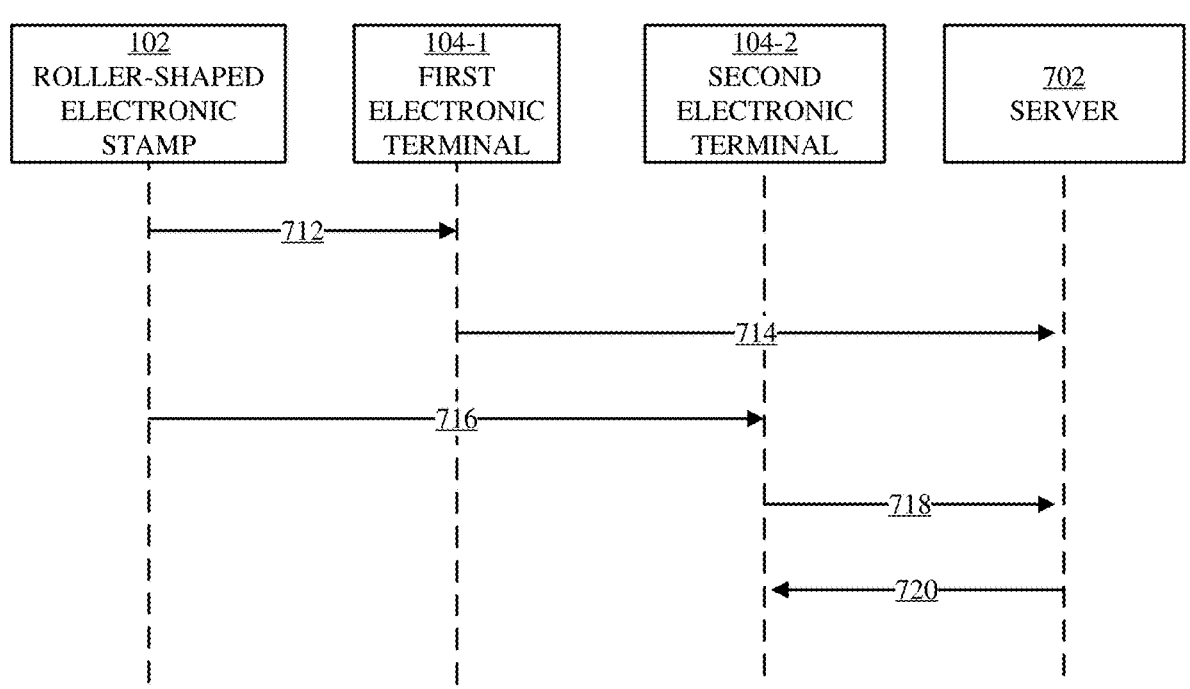
FIG. 7B illustrates an example second data flow diagram illustrating interactions between components in the second system, in accordance with some embodiments of the present disclosure.

FIG. 7B illustrates a second data flow diagram 710 according to the second system 700, in accordance with some embodiments of the present disclosure. At operation 712, the roller-shaped electronic stamp 102 can transmit one or more of key information 304 and/or server information 306 to the first electronic terminal 104-1 by rolling the roller-shaped electronic stamp 102 on an interface of the first electronic terminal 104-1. In other words, the pattern of contact points 210 can be configured to contain one or more of the key information 304 and/or the server information 306.

At operation 714, the first electronic terminal 104-1 can upload a file 310 to the server 702 based on the server information 306 received from the roller-shaped electronic stamp 102. For example, the first electronic terminal 104-1 can upload the file 310 to a URL address provided in the server information 306. In some embodiments, the first electronic terminal 104-1 encrypts the file 310 using the key information 304 before uploading the encrypted file 310 to the server 702.

At operation 716, the roller-shaped electronic stamp 102 can transmit one or more of key information 304 and/or server information 306 to the second electronic terminal 104-2 by rolling the roller-shaped electronic stamp 102 on an interface of the second electronic terminal 104-2.

At operation 718, the second electronic terminal 104-2 can access the server 702 using the server information 306 received from the roller-shaped electronic stamp 102. For example, the second electronic terminal 104-2 can access a URL address included in the server information 306.

At operation 720, the second electronic terminal 104-2 can download the file 310 from the server 702. In some embodiments, operation 720 includes decrypting the file 310 using key information 304 received from the roller-shaped electronic stamp 102.

Figure 8A:
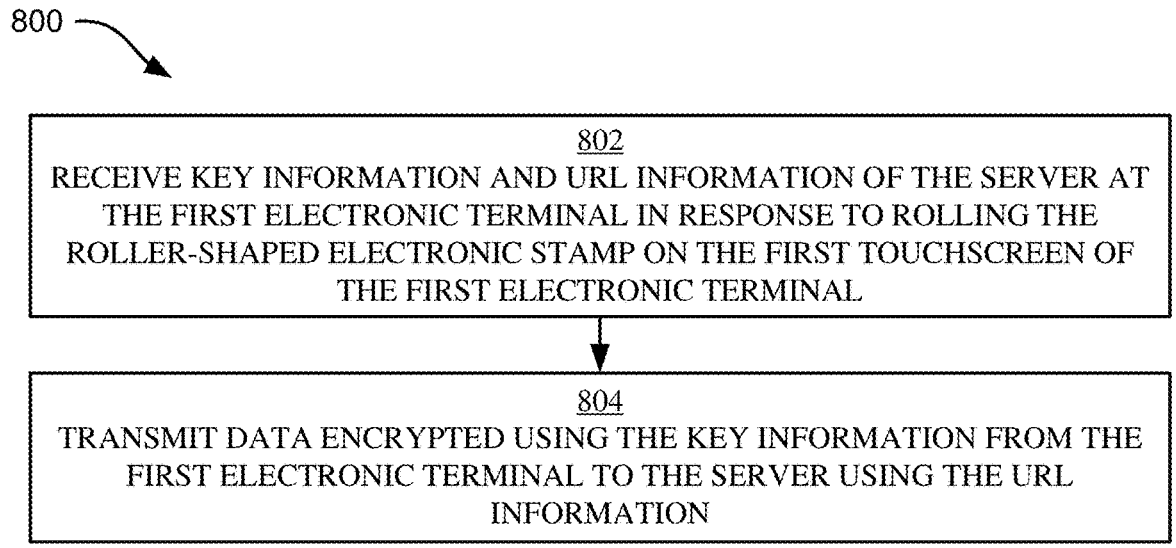
FIG. 8A illustrates a flowchart of an example second method for uploading data to a server functioning as a data transfer intermediary based on information from a roller-shaped electronic stamp, in accordance with some embodiments of the present disclosure.

FIG. 8A illustrates a flowchart of a second method 800 for transmitting data from a first electronic terminal 104-1 to a server 702 based on information received from a roller-shaped electronic stamp 102, in accordance with some embodiments of the present disclosure. In some embodiments, the second method 800 is performed by an application 312 executing on the first electronic terminal 104-1, by a computer 400, or by another configuration of hardware and/or software.

Operation 802 includes receiving key information 304 and/or server information 306 (e.g., a URL address of the server 702) at the first electronic terminal 104-1 and from the roller-shaped electronic stamp 102. In some embodiments, the key information 304 and/or the server information 306 is included in a pattern of contact points 210 of the roller-shaped electronic stamp 102 that is transmitted to the first electronic terminal 104-1 by rolling the roller-shaped electronic stamp 102 on an interface of the first electronic terminal 104-1.

Operation 804 includes transmitting data (e.g., file 310) that is optionally encrypted using the key information 304 to the server 702 according to the server information 306. In some embodiments, the data is transmitted to a URL address of the server 702 that is included in the server information 306 received at the first electronic terminal 104-1 from the roller-shaped electronic stamp 102.

Figure 8B:
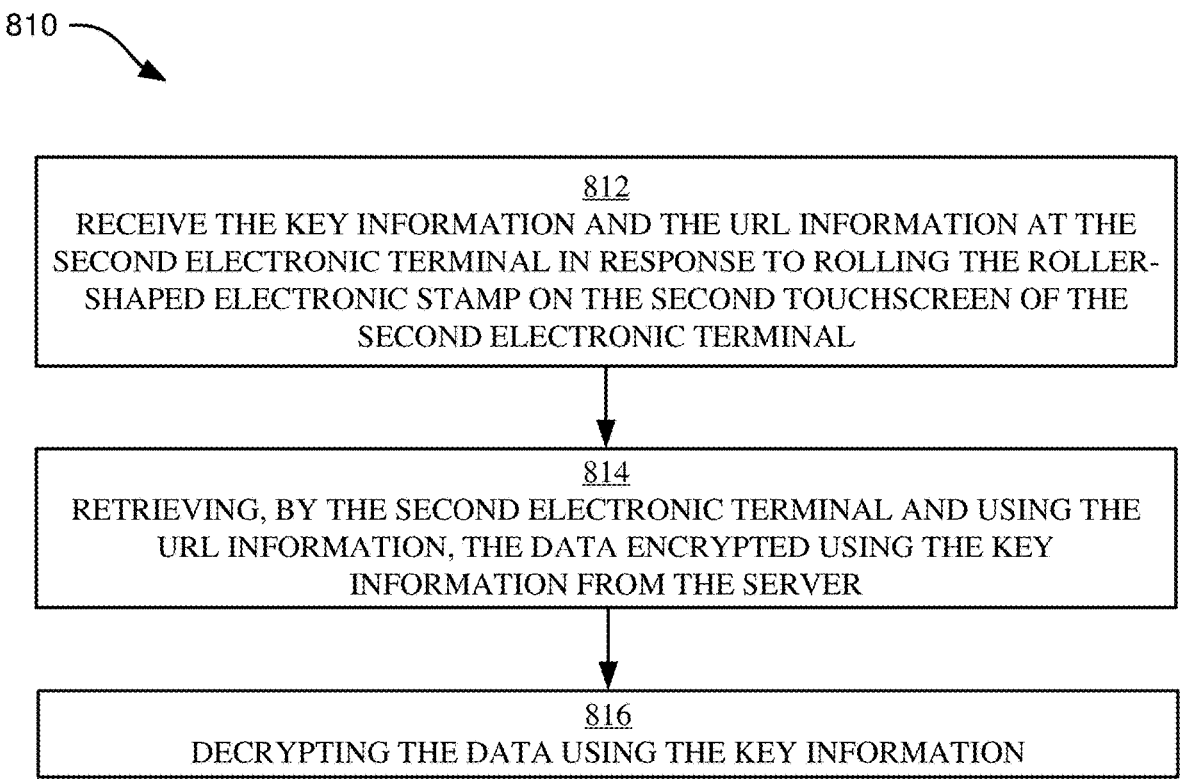
FIG. 8B illustrates a flowchart of an example third method for downloading data from a server functioning as a data transfer intermediary based on information from a roller-shaped electronic stamp, in accordance with some embodiments of the present disclosure.

FIG. 8B illustrates a flowchart of a third method 810 for downloading data to a second electronic terminal 104-2 from a server 702, in accordance with some embodiments of the present disclosure. In some embodiments, the third method 810 is implemented by an application 312 executing on a second electronic terminal 104-2, by a computer 400, or by another configuration of hardware and/or software. In some embodiments, the third method 810 occurs after the second method 800 of FIG. 8A.

Operation 812 includes receiving key information 304 and/or server information 306 (e.g., a URL address of the server 702) at the second electronic terminal 104-2 and from the roller-shaped electronic stamp 102. In some embodiments, the key information 304 and/or the server information 306 is included in a pattern of contact points 210 of the roller-shaped electronic stamp 102 that is transmitted to the second electronic terminal 104-2 by rolling the roller-shaped electronic stamp 102 on an interface of the second electronic terminal 104-2.

Operation 814 includes retrieving, by the second electronic terminal 104-2 and from the server 702, data (e.g., file 310) that is stored on the server 702. In some embodiments, operation 814 includes accessing the server 702 by accessing a URL address included in the server information 306 that is received from the roller-shaped electronic stamp 102.

Operation 816 includes decrypting the downloaded data using the key information 304 in embodiments where the downloaded data is encrypted and where the key information 304 is provided to the second electronic terminal 104-2 by the roller-shaped electronic stamp 102. In some embodiments, operation 816 includes storing the downloaded (and, in some embodiments, decrypted) data in a computer-readable storage medium that is communicatively coupled to the second electronic terminal 104-2.

Figure 9A:
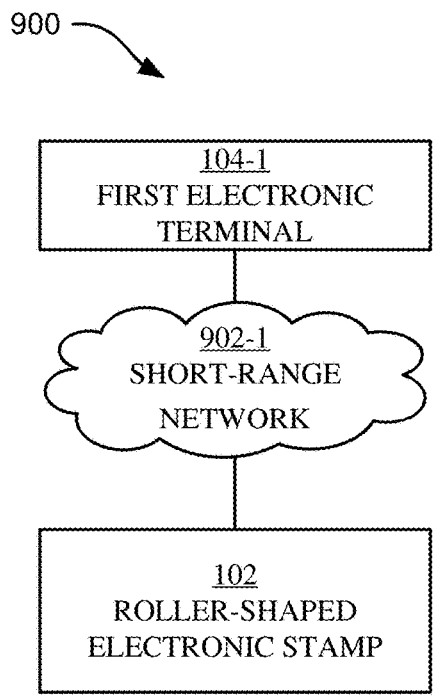
FIG. 9A illustrates a block diagram of an example third system at a first time, in accordance with some embodiments of the present disclosure.
Figure 9B:
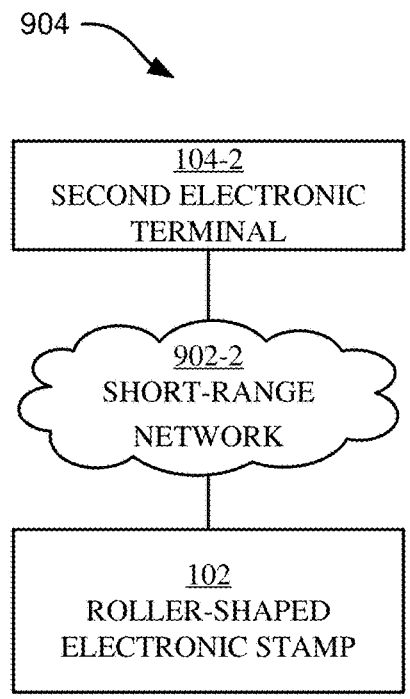
FIG. 9B illustrates a block diagram of the third system at a second time, in accordance with some embodiments of the present disclosure.

FIG. 9A illustrates a third system at a first time 900 and FIG. 9B illustrates the third system at a second time 904, in accordance with some embodiments of the present disclosure. The third system at the first time 900 (FIG. 9A) includes a first electronic terminal 104-1 communicatively coupled to the roller-shaped electronic stamp 102 by a short-range network 902-1. Here, the roller-shaped electronic stamp 102 can first be rolled on an interface of the first electronic terminal 104-1 in order to transfer information related to a short-range communication protocol 308 to the first electronic terminal 104-1. In some embodiments, key information 304 is also transferred to the first electronic terminal 104-1. After rolling the roller-shaped electronic stamp 102 on the interface of the first electronic terminal 104-1, the roller-shaped electronic stamp 102 and the first electronic terminal 104-1 can establish short-range network 902-1 for the purposes of sharing information. For example, first electronic terminal 104-1 can transfer data (e.g., file 310) to the roller-shaped electronic stamp 102, or vice versa (e.g., the roller-shaped electronic stamp 102 can transfer data to the first electronic terminal 104-1).

The third system at the second time 904 (FIG. 9B) includes a second electronic terminal 104-2 communicatively coupled to the roller-shaped electronic stamp 102 by a second short-range network 902-2. In some embodiments, the third system at the second time 904 occurs at a later time after the third system at the first time 900 so that data transferred from the first electronic terminal 104-1 to the roller-shaped electronic stamp 102 can subsequently be transferred from the roller-shaped electronic stamp 102 to the second electronic terminal 104-2. In other words, FIGS. 9A and 9B illustrate embodiments where the roller-shaped electronic stamp 102 functions as a secure intermediary for data transfer. The third system at the second time 904 can be initiated by first rolling the roller-shaped electronic stamp 102 on an interface of the second electronic terminal 104-2 in order to transmit at least information related to a short-range communication protocol 308 to the second electronic terminal 104-2. In some embodiments, key information 304 is also transmitted to the second electronic terminal 104-2 by rolling the roller-shaped electronic stamp 102 on the interface of the second electronic terminal 104-2.

After receiving at least the short-range communication protocol 308 (and optionally the key information 304), the second electronic terminal 104-2 and the roller-shaped electronic stamp 102 can establish the second short-range network 902-2 for the purposes of transmitting data to one another. In some embodiments, the second short-range network 902-2 is a second instantiation of a same type of short-range network as the (first instantiation of) the short-range network 902-1. In some embodiments, the roller-shaped electronic stamp 102 transmits data received from the first electronic terminal 104-1 in the third system at the first time 900 to the second electronic terminal 104-2. In other words, the roller-shaped electronic stamp 102 is used as an intermediary for sharing data between electronic terminals which may not be able to securely communicate directly with one another.

Figure 9C:
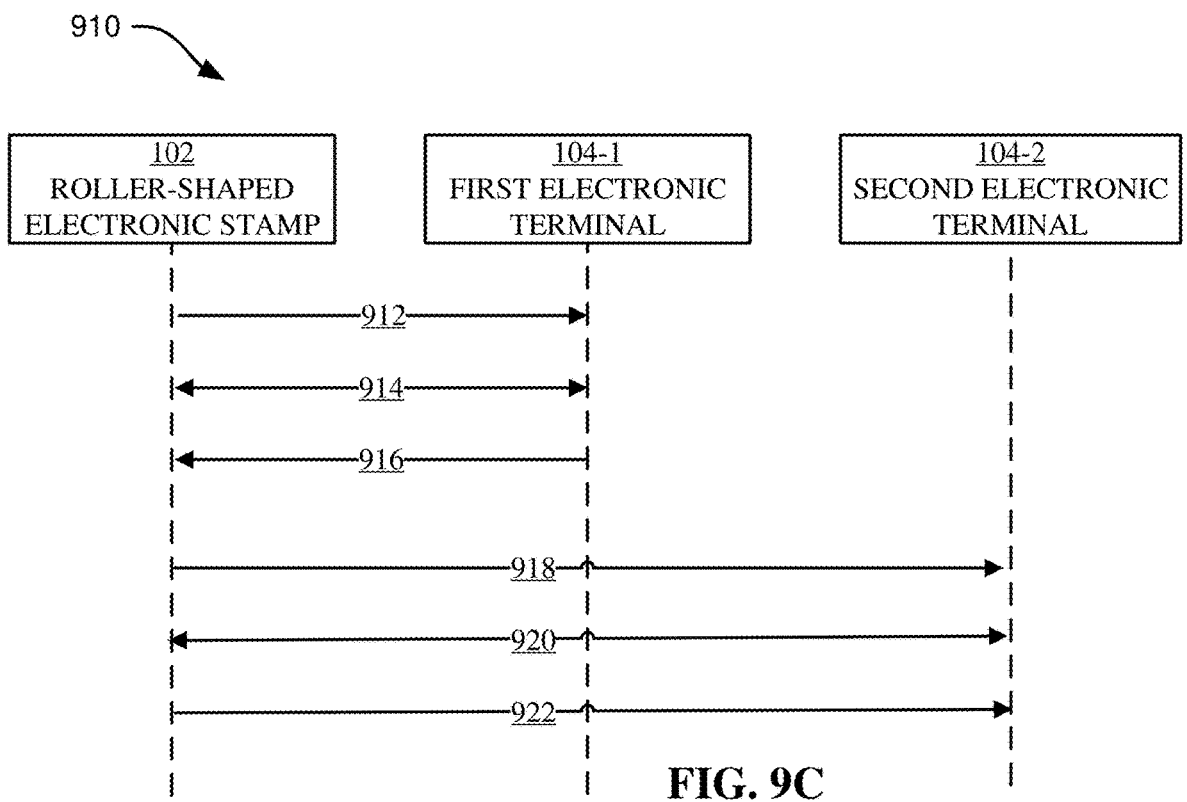
FIG. 9C illustrates an example third data flow diagram illustrating interactions between components in the third system, in accordance with some embodiments of the present disclosure.

FIG. 9C illustrates a third data flow diagram 910 for using the roller-shaped electronic stamp 102 as a data transfer intermediary between disconnected (or insecurely connected) electronic terminals, in accordance with some embodiments of the present disclosure.

At operation 912, the roller-shaped electronic stamp 102 can transfer short-range protocol 308 and/or key information 304 to the first electronic terminal 104-1 by rolling the roller-shaped electronic stamp 102 on an interface of the first electronic terminal 104-1. At operation 914, the roller-shaped electronic stamp 102 and the first electronic terminal 104-1 can establish a first short-range network 902-1 according to the short-range communication protocol 308. Operation 916 can include transferring data (e.g., files 310) from the first electronic terminal 104-1 and to the roller-shaped electronic stamp 102 via the first short-range network 902-1. Operations 912-916 can occur during a first time interval.

At operation 918 the roller-shaped electronic stamp 102 can transfer short-range protocol 308 and/or key information 304 to the second electronic terminal 104-2 by rolling the roller-shaped electronic stamp 102 on an interface of the second electronic terminal 104-2. At operation 920, the roller-shaped electronic stamp 102 and the second electronic terminal 104-2 can establish a second short-range network 902-2 according to the short-range communication protocol 308. Operation 922 can include transferring data (e.g., files 310) from the roller-shaped electronic stamp 102 and to the second electronic terminal 104-2 via the second short-range network 902-2. In some embodiments, operation 922 transfers the data received from the first electronic terminal 104-1 to the second electronic terminal 104-2. In some embodiments, operations 918-922 occur during a second time interval after the first interval when operations 912-916 occurred.

Figure 10A:
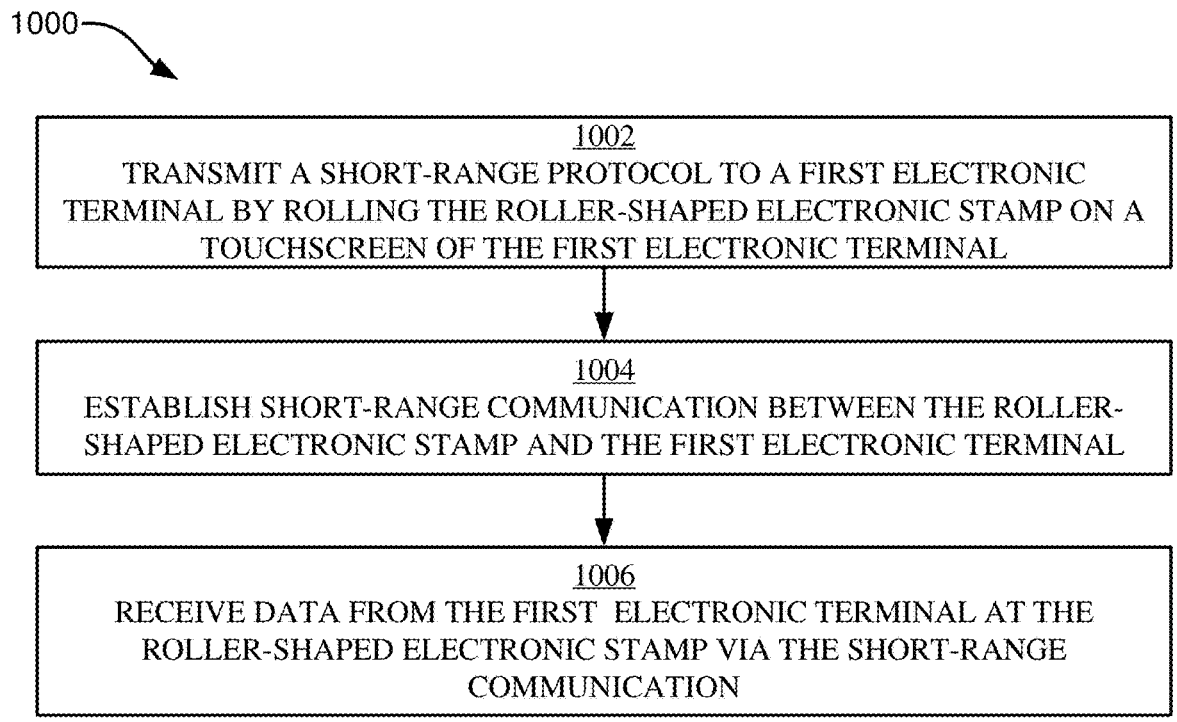
FIG. 10A illustrates a flowchart of an example fourth method for receiving data at a roller-shaped electronic stamp from a first electronic terminal for transfer at a later time to a second electronic terminal, in accordance with some embodiments of the present disclosure.

FIG. 10A illustrates a flowchart of a fourth method 1000 for receiving data at a roller-shaped electronic stamp 102 from a first electronic terminal 104-1 for transfer at a later time to a second electronic terminal 104-2, in accordance with some embodiments of the present disclosure. In some embodiments, the fourth method 1000 is performed by a roller-shaped electronic stamp 102.

Operation 1002 includes transmitting short-range communication protocol 308 and/or key information 304 to the first electronic terminal 104-1 by rolling the roller-shaped electronic stamp 102 on an interface of the first electronic terminal 104-1. In other words, the pattern of contact points 210 can be configured to contain the short-range communication protocol 308 and/or the key information 304.

Operation 1004 includes establishing a first short-range network 902-1 communicatively coupling the roller-shaped electronic stamp 102 to the first electronic terminal 104-1. Operation 1004 can rely on the short-range communication protocol 308 to trigger establishment of the first short-range network 902-1.

Operation 1006 includes receiving data (e.g., files 310) from the first electronic terminal 104-1 and at the roller-shaped electronic stamp 102 using the first short-range network 902-1. The transmitted data can be data intended for a second electronic terminal 104-2 that is not connected to (or insecurely connected to) the first electronic terminal 104-1, where the roller-shaped electronic stamp 102 is used as a secure intermediary for transferring the transmitted data to the second electronic terminal 104-2. In embodiments where key information 304 is transferred to the first electronic terminal 104-1 in operation 1002, the received data can be encrypted according to the key information 304 (e.g., the first electronic terminal 104-1 can encrypt the data according to the key information 304 prior to transmitting the encrypted data to the roller-shaped electronic stamp in operation 1006).

Figure 10B:
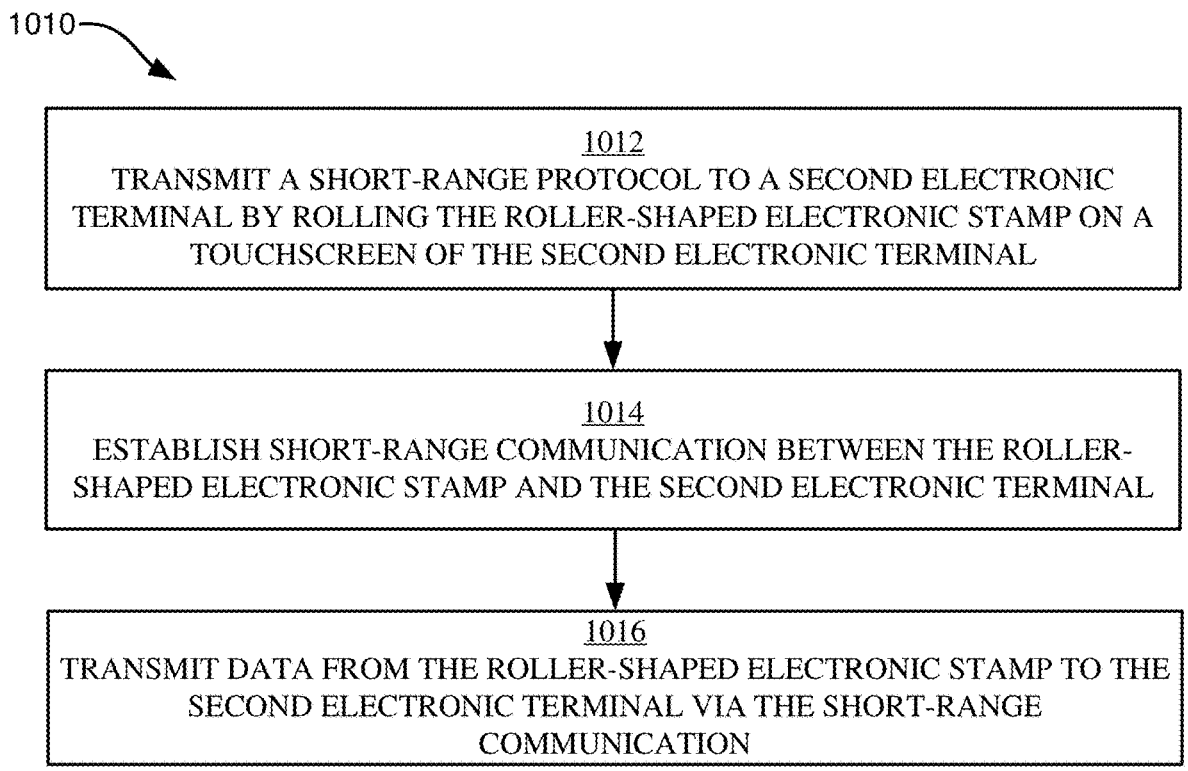
FIG. 10B illustrates a flowchart of an example fifth method for transmitting data from a roller-shaped electronic stamp to a second electronic terminal, where the transmitted data was received from a first electronic terminal, in accordance with some embodiments of the present disclosure.

FIG. 10B illustrates a flowchart of a fifth method 1010 for transmitting data from a roller-shaped electronic stamp 102 to a second electronic terminal 104-2, where the transmitted data was received from a first electronic terminal 104-1. In some embodiments, the fifth method 1010 is implemented by a roller-shaped electronic stamp 102. In some embodiments, the fifth method 1010 occurs after the fourth method 1000 of FIG. 10A.

Operation 1012 includes transferring short-range communication protocol 308 and/or key information 304 to the second electronic terminal 104-2 by rolling the roller-shaped electronic stamp 102 on an interface of the second electronic terminal 104-2. In other words, the pattern of contact points 210 can be configured to contain the short-range communication protocol 308 and/or the key information 304.

Operation 1014 includes establishing a second short-range network 902-2 between the roller-shaped electronic stamp 102 and the second electronic terminal 104-1. The second short-range network 902-2 can be established according to the short-range communication protocol 308.

Operation 1016 includes transmitting data (e.g., files 310) from the roller-shaped electronic stamp 102 to the second electronic terminal 104-2 using the second short-range network 902-2. In some embodiments, the transmitted data is the data received from the first electronic terminal 104-1 in operation 1006 of the fourth method 1000. In some embodiments, the data is encrypted, and in such embodiments, the second electronic terminal 104-2 can decrypt the received data using the key information 304.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described herein and/or implement the functionality discussed herein) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

Several non-limiting example embodiments of various aspects of the present disclosure will now be enumerated.

Example Embodiment 1. A roller-shaped electronic stamp comprising a plurality of protrusions arranged on a surface of a cylindrical rotational body that rotates around a shaft, wherein a pattern of contact points that is provided by the plurality of protrusions represents data, and wherein the data is transmitted to an electronic terminal by rolling the surface of the cylindrical rotational body on a touchscreen of the electronic terminal.

Example Embodiment 2. The roller-shaped electronic stamp according to example embodiment 1, wherein the data comprises key information for encrypting and decrypting files.

Example Embodiment 3. The roller-shaped electronic stamp according to example embodiments 1 or 2, wherein the data comprises a short-range communication protocol for establishing a short-range network with at least one other device.

Example Embodiment 4. The roller-shaped electronic stamp according to any one of example embodiments 1-3, wherein the data comprises a uniform resource locator (URL) of a server.

Example Embodiment 5. The roller-shaped electronic stamp according to any one of example embodiments 1-4, wherein the pattern of contact points represents at least 112 bits of data.

Example Embodiment 6. The roller-shaped electronic stamp according to any one of example embodiments 1-5, wherein a respective protrusion of the plurality of protrusions comprises a height that does not interfere with longitudinally adjacent protrusions.

Example Embodiment 7. The roller-shaped electronic stamp according to any one of example embodiments 1-6, wherein a respective protrusion of the plurality of protrusions is located in a respective cell with a sufficient width so that laterally adjacent protrusions can be recognized by a touch sensor resolution of the touchscreen.

Example Embodiment 8. The roller-shaped electronic stamp according to any one of example embodiments 1-7, wherein the pattern of contact points comprises active contact points and inactive contact points.

Example Embodiment 9. The roller-shaped electronic stamp according to example embodiment 8, wherein the active contact points are electrified and the inactive contact points are not electrified.

Example Embodiment 10. The roller-shaped electronic stamp according to example embodiment 8, wherein the active contact points have a larger height than the inactive contact points.

Example Embodiment 11. The roller-shaped electronic stamp according to any one of example embodiments 1-10, wherein the pattern of contact points includes a calibration column having active contact points in each cell of the calibration column, and wherein the calibration column indicates a separation distance of longitudinally adjacent contact points.

Example Embodiment 12. The roller-shaped electronic stamp according to any one of example embodiments 1-11, wherein the pattern of contact points includes a sequencing pattern comprising a predetermined pattern of active contact points that indicate a sequence of the pattern of contact points.

Example Embodiment 13. The roller-shaped electronic stamp according to any one of example embodiments 1-12, wherein the electronic terminal executes an application configured to convert the pattern of contact points to the data for use by the electronic terminal.

Example Embodiment 14. A method comprising: receiving key information at a first electronic terminal by rolling a roller-shaped electronic stamp on a first touchscreen of the first electronic terminal; broadcasting, by the first electronic terminal, a message that the first electronic terminal can receive data via short-range communication; and receiving, at the first electronic terminal and from a second electronic terminal via the short-range communication, a file encrypted using the key information.

Example Embodiment 15. The method of example embodiment 14, wherein the file is encrypted using the key information by the second electronic terminal, and wherein the second electronic terminal receives the key information by rolling the roller-shaped electronic stamp on a second touchscreen of the second electronic terminal.

Example Embodiment 16. The method of example embodiments 14 or 15, further comprising: decrypting, by the first electronic terminal and using the key information, the file encrypted using the key information.

Example Embodiment 17. The method of any one of example embodiments 14-16, wherein the roller-shaped electronic stamp comprises a plurality of protrusions arranged on a surface of a cylindrical rotational body that rotates around a shaft, wherein a pattern of contact points provided by the plurality of protrusions represents the key information.

Example Embodiment 18. A method comprising: receiving key information and universal resource locator (URL) information of a server at a first electronic terminal by rolling a roller-shaped electronic stamp on a first touchscreen of the first electronic terminal; and transmitting data encrypted using the key information from the first electronic terminal to the server according to the URL information, wherein the server is used as an intermediary for sharing data between the first electronic terminal and a second electronic terminal.

Example Embodiment 19. The method of example embodiment 18, further comprising: receiving the key information and the URL information at the second electronic terminal by rolling the roller-shaped electronic stamp on a second touchscreen of the second electronic terminal; retrieving, by the second electronic terminal and using the URL information, the data encrypted using the key information from the server; and decrypting the data using the key information.

Example Embodiment 20. The method of example embodiments 18 or 19, wherein the roller-shaped electronic stamp comprises a plurality of protrusions arranged on a surface of a cylindrical rotational body that rotates around a shaft, and wherein a pattern of contact points represented by the plurality of protrusions contains the key information and the URL information.

Example Embodiment 21. A method comprising: transmitting a short-range communication protocol from a roller-shaped electronic stamp to a first electronic terminal by rolling the roller-shaped electronic stamp on a touchscreen of the first electronic terminal; establishing a short-range network between the roller-shaped electronic stamp and the first electronic terminal in response to rolling the roller-shaped electronic stamp on the touchscreen of the first electronic terminal; and transmitting data from the roller-shaped electronic stamp to the first electronic terminal via the short-range network in response to establishing the short-range network.

Example Embodiment 22. The method of example embodiment 21, wherein the roller-shaped electronic stamp comprises a plurality of protrusions arranged on a surface of a cylindrical rotational body that rotates around a shaft, wherein a pattern of contact points that is provided by the plurality of protrusions represents the short-range communication protocol.

Example Embodiment 23. A method comprising: transmitting a short-range communication protocol to a first electronic terminal by rolling a roller-shaped electronic stamp on a touchscreen of the first electronic terminal; establishing short-range communication between the roller-shaped electronic stamp and the first electronic terminal in response to rolling the roller-shaped electronic stamp on the touchscreen of the first electronic terminal; and receiving a file from the first electronic terminal at the roller-shaped electronic stamp via the short-range communication in response to establishing the short-range communication, wherein the roller-shaped electronic stamp is used as an intermediary for transferring the file to a second electronic terminal.

Example Embodiment 24. The method according to example embodiment 23, further comprising: transmitting the short-range communication protocol to the second electronic terminal by rolling the roller-shaped electronic stamp on a second touchscreen of the second electronic terminal after receiving the file from the first electronic terminal at the roller-shaped electronic stamp; establishing short-range communication between the roller-shaped electronic stamp and the second electronic terminal in response to rolling the roller-shaped electronic stamp on the second touchscreen of the second electronic terminal; and transmitting the file from the roller-shaped electronic stamp to the second electronic terminal via the short-range communication in response to establishing the short-range communication.

Example Embodiment 25. The method according to example embodiments 23 or 24, wherein the short-range communication protocol comprises a pattern of contact points on a cylindrical rotational body of the roller-shaped electronic stamp, wherein the pattern of contact points is readable by an application executing on the first electronic terminal and the second electronic terminal.

What is claimed is:

1. A roller-shaped electronic stamp comprising a plurality of protrusions arranged on a surface of a cylindrical rotational body that rotates around a shaft, wherein a pattern of contact points that is provided by the plurality of protrusions represents data, and wherein the data is transmitted to an electronic terminal by rolling the surface of the cylindrical rotational body on a touchscreen of the electronic terminal.

2. The roller-shaped electronic stamp according to claim 1, wherein the data comprises key information for encrypting and decrypting files.

3. The roller-shaped electronic stamp according to claim 1, wherein the data comprises a short-range communication protocol for establishing a short-range network with at least one other device.

4. The roller-shaped electronic stamp according to claim 1, wherein the data comprises a uniform resource locator (URL) of a server.

5. The roller-shaped electronic stamp according to claim 1, wherein the pattern of contact points represents at least 112 bits of data.

6. The roller-shaped electronic stamp according to claim 1, wherein a respective protrusion of the plurality of protrusions comprises a height that does not interfere with longitudinally adjacent protrusions.

7. The roller-shaped electronic stamp according to claim 1, wherein a respective protrusion of the plurality of protrusions is located in a respective cell with a sufficient width so that laterally adjacent protrusions can be recognized by a touch sensor resolution of the touchscreen.

8. The roller-shaped electronic stamp according to claim 1, wherein the pattern of contact points comprises active contact points and inactive contact points.

9. The roller-shaped electronic stamp according to claim 8, wherein the active contact points are electrified and the inactive contact points are not electrified.

10. The roller-shaped electronic stamp according to claim 8, wherein the active contact points have a larger height than the inactive contact points.

11. The roller-shaped electronic stamp according to claim 1, wherein the pattern of contact points includes a calibration column having active contact points in each cell of the calibration column, and wherein the calibration column indicates a separation distance of longitudinally adjacent contact points.

12. The roller-shaped electronic stamp according to claim 1, wherein the pattern of contact points includes a sequencing pattern comprising a predetermined pattern of active contact points that indicate a sequence of the pattern of contact points.

13. The roller-shaped electronic stamp according to claim 1, wherein the electronic terminal executes an application configured to convert the pattern of contact points to the data for use by the electronic terminal.

14. A method comprising:
receiving key information at a first electronic terminal by rolling a roller-shaped electronic stamp on a first touchscreen of the first electronic terminal;
broadcasting, by the first electronic terminal, a message that the first electronic terminal can receive data via short-range communication; and
receiving, at the first electronic terminal and from a second electronic terminal via the short-range communication, a file encrypted using the key information.

15. The method of claim 14, wherein the file is encrypted using the key information by the second electronic terminal, and wherein the second electronic terminal receives the key information by rolling the roller-shaped electronic stamp on a second touchscreen of the second electronic terminal.

16. The method of claim 14, further comprising:
decrypting, by the first electronic terminal and using the key information, the file encrypted using the key information.

17. The method of claim 14, wherein the roller-shaped electronic stamp comprises a plurality of protrusions arranged on a surface of a cylindrical rotational body that rotates around a shaft, wherein a pattern of contact points provided by the plurality of protrusions represents the key information.

18. A method comprising:
receiving key information and universal resource locator (URL) information of a server at a first electronic terminal by rolling a roller-shaped electronic stamp on a first touchscreen of the first electronic terminal; and
transmitting data encrypted using the key information from the first electronic terminal to the server according to the URL information, wherein the server is used as an intermediary for sharing data between the first electronic terminal and a second electronic terminal.

19. The method of claim 18, further comprising:
receiving the key information and the URL information at the second electronic terminal by rolling the roller-shaped electronic stamp on a second touchscreen of the second electronic terminal;
retrieving, by the second electronic terminal and using the URL information, the data encrypted using the key information from the server; and
decrypting the data using the key information.

20. The method of claim 18, wherein the roller-shaped electronic stamp comprises a plurality of protrusions arranged on a surface of a cylindrical rotational body that rotates around a shaft, and wherein a pattern of contact points represented by the plurality of protrusions contains the key information and the URL information.

21. A method comprising:
    transmitting a short-range communication protocol from a roller-shaped electronic stamp to a first electronic terminal by rolling the roller-shaped electronic stamp on a touchscreen of the first electronic terminal;
    establishing a short-range network between the roller-shaped electronic stamp and the first electronic terminal in response to rolling the roller-shaped electronic stamp on the touchscreen of the first electronic terminal; and
    transmitting data from the roller-shaped electronic stamp to the first electronic terminal via the short-range network in response to establishing the short-range network.

22. The method of claim 21, wherein the roller-shaped electronic stamp comprises a plurality of protrusions arranged on a surface of a cylindrical rotational body that rotates around a shaft, wherein a pattern of contact points that is provided by the plurality of protrusions represents the short-range communication protocol.

23. A method comprising:
    transmitting a short-range communication protocol to a first electronic terminal by rolling a roller-shaped electronic stamp on a touchscreen of the first electronic terminal;
    establishing short-range communication between the roller-shaped electronic stamp and the first electronic terminal in response to rolling the roller-shaped electronic stamp on the touchscreen of the first electronic terminal; and
    receiving a file from the first electronic terminal at the roller-shaped electronic stamp via the short-range communication in response to establishing the short-range communication, wherein the roller-shaped electronic stamp is used as an intermediary for transferring the file to a second electronic terminal.

24. The method according to claim 23, further comprising:
    transmitting the short-range communication protocol to the second electronic terminal by rolling the roller-shaped electronic stamp on a second touchscreen of the second electronic terminal after receiving the file from the first electronic terminal at the roller-shaped electronic stamp;
    establishing short-range communication between the roller-shaped electronic stamp and the second electronic terminal in response to rolling the roller-shaped electronic stamp on the second touchscreen of the second electronic terminal; and
    transmitting the file from the roller-shaped electronic stamp to the second electronic terminal via the short-range communication in response to establishing the short-range communication.

25. The method according to claim 23, wherein the short-range communication protocol comprises a pattern of contact points on a cylindrical rotational body of the roller-shaped electronic stamp, wherein the pattern of contact points is readable by an application executing on the first electronic terminal and the second electronic terminal.

* * * * *